(12) United States Patent
Tsen

(10) Patent No.: US 11,188,027 B2
(45) Date of Patent: Nov. 30, 2021

(54) SYSTEMS, DEVICES, AND METHODS FOR SIDE LOBE CONTROL IN HOLOGRAMS

(71) Applicant: GOOGLE LLC, Mountain View, CA (US)

(72) Inventor: Robin W. Tsen, Kitchener (CA)

(73) Assignee: Google LLC, Mountain View, CA (US)

( * ) Notice: Subject to any disclaimer, the term of this patent is extended or adjusted under 35 U.S.C. 154(b) by 132 days.

(21) Appl. No.: 16/276,051

(22) Filed: Feb. 14, 2019

(65) Prior Publication Data

US 2019/0250563 A1      Aug. 15, 2019

Related U.S. Application Data

(60) Provisional application No. 62/664,758, filed on Apr. 30, 2018, provisional application No. 62/631,278, filed on Feb. 15, 2018.

(51) Int. Cl.
| | |
|---|---|
| *G03H 1/26* | (2006.01) |
| *G02B 27/01* | (2006.01) |
| *G03H 1/02* | (2006.01) |

(52) U.S. Cl.
CPC ........... *G03H 1/26* (2013.01); *G02B 27/0172* (2013.01); *G03H 1/02* (2013.01); *G03H 1/0236* (2013.01); *G03H 1/2645* (2013.01); *G02B 2027/0174* (2013.01); *G02B 2027/0178* (2013.01); *G03H 2001/026* (2013.01); *G03H 2001/0212* (2013.01); *G03H 2001/266* (2013.01); *G03H 2222/13* (2013.01)

(58) Field of Classification Search
CPC .......... G03H 1/26; G03H 1/02; G03H 1/2645; G03H 1/0236; G03H 2001/026; G03H 2001/266; G03H 2222/13; G03H 2001/0212; G03H 1/0486; G03H 2001/0439; G03H 2001/0489; G03H 1/202; G03H 1/0248; G03H 1/28; G02B 27/0172; G02B 2027/0178; G02B 2027/0174

See application file for complete search history.

(56) References Cited

U.S. PATENT DOCUMENTS

| | | | |
|---|---|---|---|
| 4,687,720 A | 8/1987 | Wreede et al. | |
| 5,648,857 A * | 7/1997 | Ando | G03H 1/202 359/12 |

(Continued)

OTHER PUBLICATIONS

Non-Final Office Action dated Sep. 23, 2020 for U.S. Appl. No. 16/276,038, 21 pages.

(Continued)

*Primary Examiner* — Wen Huang

(57) ABSTRACT

Systems, devices, and methods for side lobe control in holograms are described. The magnitude of the side lobes of a hologram depends on the distribution of refractive index modulation (Δn), therefore control of side lobe magnitude may be achieved by controlling the distribution of Δn. The distribution of Δn may be controlled by replicating a hologram from a master with two reference beams, where the wavelength and angle of each reference beam, the playback angle of the master hologram, and the thickness of the master hologram, the copy holographic recording medium (HRM), and the recording substrate are carefully chosen to achieve a pattern of meta-interference within the HRM that matches the desired distribution of Δn.

7 Claims, 8 Drawing Sheets

(56) References Cited

U.S. PATENT DOCUMENTS

| | | |
|---|---|---|
| 9,551,830 B1 | 1/2017 | Anderson et al. |
| 9,864,339 B2 | 1/2018 | Cowan |
| 2007/0115522 A1 | 5/2007 | Ueda et al. |
| 2016/0377866 A1 | 12/2016 | Alexander et al. |
| 2019/0250561 A1 | 8/2019 | Tsen |
| 2019/0250562 A1 | 8/2019 | Tsen |

OTHER PUBLICATIONS

Non-Final Office Action dated Jun. 25, 2021 for U.S. Appl. No. 16/276,029, 18 pages.

* cited by examiner

SYSTEMS, DEVICES, AND METHODS FOR SIDE LOBE CONTROL IN HOLOGRAMS

TECHNICAL FIELD

The present systems, devices, and methods generally relate to holograms and particularly relate to controlling the side lobes in holograms.

BACKGROUND

Description of the Related Art

Holograms

A hologram is a recording of a light field, with a typical light field comprising a pattern of optical fringes generated by interference between two beams of laser light. The hologram is made up of physical fringes, where physical fringes comprise variations in the refractive index or absorbance of the holographic recording medium.

During hologram playback, at least a portion of the light field used to record a hologram may be recreated by illuminating the hologram with laser light. If the laser light comprises the same wavelength and angle as the first beam of laser light used to record the hologram, and the fringes have not been altered after recording, the holographic medium will diffract laser light with the same angle and pattern as the second beam of laser light used to record the hologram. The intensity of the diffracted light is determined by the efficiency of the hologram, where the efficiency of the hologram is the fraction of the light of the first beam of laser light that is diffracted in the direction of the second beam of laser light; hologram efficiency may be in a range from 0-100%. The efficiency of a hologram depends on both the angle and the wavelength of light used to illuminate the holographic medium. Multiple holograms may be recorded in a single holographic recording medium, the multiple holograms comprising a multiplexed hologram.

Hologram Recording

A pattern of optical fringes may be generated by the interference of two beams of laser light; the two beams of laser light may be created by splitting a single beam of laser light. The two beams of laser light are typically referred to as the object beam and the reference beam. Hologram recording is typically designed such that, during playback, the recorded hologram is illuminated with laser light recreating the reference beam and the object beam is then replicated by the hologram.

Holograms are recorded in a holographic recording medium which may be a silver halide photographic emulsion, dichromated gelatin, photopolymer, or other physical media. Silver halide emulsions record a hologram as a pattern of absorbance and reflectance of light. Dichromated gelatin and photopolymer both record a hologram as a pattern of varying refractive index. Recording a hologram as a pattern of refractive index is advantageous since all of the illuminating laser light may theoretically leave the hologram; no light is necessarily absorbed by the hologram.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

BRIEF SUMMARY

A method of producing a hologram with controlled side lobes may be summarized as including: providing a recording substrate comprising a first surface and a second surface opposite the first surface; mounting a master hologram on the first surface of the recording substrate; mounting a holographic recording material ("HRM") on the second surface of the recording substrate; replicating the master hologram within the HRM with at least two reference beams to produce a hologram with controlled side lobes, wherein the hologram with controlled side lobes comprises a first surface and a second surface opposite the first surface; and dismounting the hologram with controlled side lobes from the recording substrate.

The method may further include replicating the master hologram within the HRM with at least two reference beams to produce a hologram with controlled side lobes includes replicating the master hologram within the HRM with at least two reference beams to produce a hologram wherein the intensity of each of the side lobes is less than one percent of the intensity of the primary hologram peak. The method may further include replicating the master hologram within the HRM with at least two reference beams to produce a hologram with controlled side lobes includes replicating the master hologram within the HRM with at least two reference beams to produce a hologram wherein the intensity of at least one of the side lobes is greater than the intensity of the primary hologram peak. The method may further include The method of claim 1, further comprising bleaching the hologram with controlled side lobes. The method may further include recording a master hologram. The method may further include replicating the master hologram within the HRM with at least two reference beams to produce a hologram with controlled side lobes includes replicating the master hologram with at least two reference beams wherein each reference beam is of a different angle than each other reference beam. The method may further include replicating the master hologram within the HRM with at least two reference beams to produce a hologram with controlled side lobes includes replicating the master hologram with at least two reference beams wherein each reference beam is of a different wavelength than each other reference beam. The method may further include replicating the master hologram within the HRM with at least two reference beams to produce a hologram with controlled side lobes includes replicating a wavelength-multiplexed master hologram with at least two reference beams to produce a wavelength-multiplexed hologram with controlled side lobes.

The wavelength multiplexed hologram with controlled side lobes may comprise a blue hologram, a red hologram, and a green hologram, and replicating a wavelength-multiplexed master hologram with at least two reference beams to produce a wavelength-multiplexed hologram with controlled side lobes may include replicating a wavelength-multiplexed master hologram comprising a blue master hologram, a red master hologram, and a green master hologram.

Replicating a wavelength-multiplexed master hologram comprising a blue master hologram, a red master hologram, and a green master hologram may include replicating a wavelength-multiplexed master hologram comprising a blue master hologram, a red master hologram, and a green master hologram wherein the bandwidth of the red master hologram is greater than the bandwidth of the green master hologram, and the bandwidth of the green master hologram may be greater than the bandwidth of the blue master hologram. Replicating a wavelength-multiplexed master hologram may include replicating a wavelength-multiplexed master hologram with at least two blue beams of laser light, at least two green beams of laser light, and at least two red beams of laser light.

Replicating a wavelength-multiplexed master hologram with at least two blue beams of laser light, at least two green beams of laser light, and at least two red beams of laser light may include: replicating the wavelength-multiplexed master hologram with two blue beams of laser light wherein the two blue beams of laser light differ in wavelength by a first $\Delta\lambda$; replicating the wavelength-multiplexed master hologram with two green beams of laser light wherein the two green beams of laser light differ in wavelength by a second $\Delta\lambda$; and replicating the wavelength-multiplexed master hologram with two red beams of laser light wherein the two red beams of laser light differ in wavelength by a third $\Delta\lambda$; wherein the first $\Delta\lambda$ may be less than the second $\Delta\lambda$ and the second $\Delta\lambda$ may be less than the third $\Delta\lambda$.

Replicating the master hologram within the HRM with at least two reference beams to produce a hologram with controlled side lobes may include replicating the master hologram with at least two reference beams to record an initial set of fringes and at least one additional set of fringes within the HRM, wherein the initial set of fringes may possess a phase within the HRM, each additional set of fringes may possess a net phase shift relative to the initial set of fringes within the HRM, and wherein the initial set of fringes and each additional set of fringes may meta-interfere.

Replicating the master hologram with at least two reference beams to record an initial set of fringes and at least one additional set of fringes within the HRM may include replicating the master hologram with at least two reference beams to record an initial set of fringes and at least one additional set of fringes within the HRM wherein: the initial set of fringes and each additional set of fringes may meta-interfere most destructively at a depth within the hologram corresponding to at least one of: the first surface and the second surface; and the initial set of fringes and each additional set of fringes may meta-interfere most constructively at a depth between the first surface and the second surface.

Replicating the master hologram with at least two reference beams to record an initial set of fringes and at least one additional set of fringes within the HRM may include replicating the master hologram with at least two reference beams to record an initial set of fringes and at least one additional set of fringes within the HRM wherein: the initial set of fringes and each additional set of fringes may meta-interfere most constructively at a depth within the hologram corresponding to at least one of: the first surface and the second surface; and the initial set of fringes and each additional set of fringes may meta-interfere most destructively at a depth between the first surface and the second surface.

The master hologram may possess a Bragg peak wavelength, each reference beam may possess a reference beam wavelength, and wherein replicating the master hologram within the HRM with at least two reference beams to produce a hologram with controlled side lobes may include replicating the master hologram within the HRM with at least two reference beams to produce a hologram with controlled side lobes wherein the difference between the Bragg peak wavelength of the master hologram and reference beam wavelength of each reference beam may be less than 2 nanometers.

Replicating the master hologram within the HRM with at least two reference beams to produce a hologram with controlled side lobes may include replicating the master hologram within the HRM with at least two reference beams to produce a hologram with controlled side lobes wherein at least one of the reference beams may comprise a plane wave. Replicating the master hologram within the HRM with at least two reference beams to produce a hologram with controlled side lobes may include replicating the master hologram within the HRM with at least two reference beams to produce a hologram with controlled side lobes wherein at least one of the reference beams comprises a spherical wave.

A hologram with controlled side lobes may be summarized as including: a first surface; a second surface opposite the first surface; an initial set of fringes within the volume of the hologram, the initial set of fringes comprising an initial fringe phase, an initial fringe spacing and an initial fringe slant angle; and at least one additional set of fringes within the volume of the hologram, wherein each additional set of fringes comprises a respective net phase shift relative to the phase of the initial set of fringes, an additional fringe spacing, and an additional fringe slant angle wherein each additional fringe spacing is equal to the initial fringe spacing, each additional fringe slant angle is not equal to the initial fringe slant angle or any other additional fringe slant angle, the initial set of fringes and all additional sets of fringes meta-interfere, and the magnitude of $\Delta n$ within the hologram varies between the first surface and the second surface.

The intensity of each of the side lobes may be less than one percent of the intensity of the primary hologram peak. The intensity of at least one of the side lobes may greater than the intensity of the primary hologram peak. The hologram may further include: the initial set of fringes and each additional set of fringes may meta-interfere most constructively at a depth through the hologram between the first surface and the second surface; the initial set of fringes and each additional set of fringes may meta-interfere at least partially destructively at the first surface; the initial set of fringes and each additional set of fringes may meta-interfere at least partially destructively at the second surface; the magnitude of Δn at the first surface may be equal to or less than 50% of the greatest magnitude of Δn within the hologram; and the magnitude of Δn at the second surface may be equal to or less than 50% of the greatest magnitude of Δn within the hologram. The magnitude of Δn may increase continuously from the first surface to the maximum value of Δn within the hologram and the magnitude of Δn may increase continuously from the second surface to the maximum value of Δn within the hologram. The hologram may include: the initial set of fringes and each additional set of fringes may meta-interfere most destructively at a depth through the hologram between the first surface and the second surface; the initial set of fringes and each additional set of fringes may meta-interfere at least partially constructively at the first surface; the initial set of fringes and each additional set of fringes may meta-interfere at least partially constructively at the second surface; at least one of: the first surface and the second surface may possess the greatest magnitude of Δn; the minimum magnitude of Δn within the volume of the hologram may be no greater than 50% of the greatest magnitude of Δn within the hologram; and the magnitude of Δn may decreases continuously from the first surface to the minimum value of Δn within the hologram and the magnitude of Δn decreases continuously from the second surface to the minimum value of Δn within the hologram.

The hologram may comprise a wavelength-multiplexed hologram. The wavelength-multiplexed hologram may comprises a blue hologram, a green hologram, a red hologram, and an infrared hologram. The hologram may further include: the intensity of the side lobes of the blue hologram relative to the intensity of primary peak of the blue hologram may be equal to the intensity of the side lobes of the green hologram relative to the intensity of primary peak of the green hologram; the intensity of the side lobes of the green hologram relative to the intensity of primary peak of the green hologram may be equal to the intensity of the side lobes of the red hologram relative to the intensity of primary peak of the red hologram; and the intensity of the side lobes of the red hologram relative to the intensity of primary peak of the red hologram may be equal to the intensity of the side lobes of the infrared hologram relative to the intensity of primary peak of the infrared hologram.

A hologram with controlled side lobes recording system may be summarized as including: a recording substrate comprising a master-side surface and copy-side surface; a copy holographic recording medium ("HRM") comprising a first copy HRM surface and a second copy HRM surface, wherein the first copy surface is physically coupled to the copy HRM-side surface of the recording substrate; a master hologram comprising master hologram fringes wherein the master hologram is physically coupled to the master-side surface; a laser light source; a first reference beam produced by the laser light source, wherein the first reference beam passes through the copy HRM, passes through the recording substrate, and impinges on the master hologram; a second reference beam produced by the laser light source, wherein the second reference beam passes through the copy HRM, passes through the recording substrate, and impinges on the master hologram; a first diffracted object beam, wherein the first diffracted object beam passes through the recording substrate and passes through the copy HRM; and a second diffracted object beam, wherein the second diffracted object beam passes through the recording substrate and passes through the copy HRM.

The second reference beam may be of a different wavelength than the first reference beam. The second reference beam may be of a different angle than the first reference beam. The first reference beam and the first diffracted object beam may interfere to produce an initial set of fringes, the second reference beam and the second diffracted object beam may interfere to form an additional set of fringes, and the initial set of fringes and the additional set of fringes may meta-interfere. The initial set of fringes and each additional set of fringes may meta-interfere most destructively at a depth within the hologram corresponding to at least one of: the first copy HRM surface and the second copy HRM surface and the initial set of fringes and each additional set of fringes may meta-interfere most constructively at a depth equidistant between the first copy HRM surface and the second copy HRM surface. The initial set of fringes and each additional set of fringes may meta-interfere most constructively at a depth within the hologram corresponding to at least one of: the first copy HRM surface and the second copy HRM surface and the initial set of fringes and each additional set of fringes may meta-interfere most destructively at a depth equidistant between the first copy HRM surface and the second copy HRM surface.

The master hologram may comprise a wavelength-multiplexed master hologram, the wavelength-multiplexed master hologram comprising: a red hologram; a green hologram; and a blue hologram; and wherein the hologram with controlled side lobes recording system may further comprise: at least two blue reference beams; at least two green reference beams; and at least two red reference beams.

An eyeglass lens for use in a wearable heads-up display may be summarized as including: a hologram with controlled side lobes comprising: a first surface; a second surface opposite the first surface; an initial set of fringes within the volume of the hologram comprising an initial fringe spacing and an initial slant angle; and at least one additional set of fringes within the volume of the hologram, wherein each additional set of fringes comprises a respective net phase shift relative to the phase of the initial set of fringes, an additional fringe spacing, and an additional fringe slant angle wherein each additional fringe spacing is equal to the initial fringe spacing, each additional fringe slant angle is not equal to the initial fringe slant angle or any other additional fringe slant angle, the initial set of fringes and all additional sets of fringes meta-interfere, and the magnitude of Δn within the hologram varies between the first surface and the second surface; and at least one lens portion, wherein each lens portion is physically coupled to the hologram with controlled side lobes.

The intensity of each of the side lobes of the hologram may be less than one percent of the intensity of the primary hologram peak. The intensity of at least one of the side lobes of the hologram may be greater than the intensity of the primary hologram peak. The initial set of fringes and each additional set of fringes may meta-interfere most constructively at a depth through the hologram between the first surface and the second surface; the initial set of fringes and each additional set of fringes may meta-interfere at least partially destructively at the first surface; the initial set of fringes and each additional set of fringes may meta-interfere at least partially destructively at the second surface; the magnitude of Δn at the first surface may be equal to or less than 50% of the greatest magnitude of Δn within the hologram; and the magnitude of Δn at the second surface may be equal to or less than 50% of the greatest magnitude of Δn within the hologram. The initial set of fringes and each additional set of fringes may meta-interfere most destructively at a depth through the hologram between the first surface and the second surface; the initial set of fringes and each additional set of fringes may meta-interfere at least partially constructively at the first surface; the initial set of fringes and each additional set of fringes may meta-interfere at least partially constructively at the second surface; at least one of: the first surface and the second surface may possess the greatest magnitude of Δn; the minimum magnitude of Δn within the volume of the hologram may be no greater than 50% of the greatest magnitude of Δn within the hologram; and the magnitude of Δn may decrease continuously from the first surface to the minimum value of Δn within the hologram and the magnitude of Δn decreases continuously from the second surface to the minimum value of Δn within the hologram. The hologram may include a wavelength-multiplexed hologram, the wavelength-multiplexed hologram comprising a blue hologram, a green hologram, a red hologram, and an infrared hologram.

A wearable heads-up display may be summarized as including: a support structure; a projector; and a transparent combiner positioned and oriented to appear in a field of view of an eye of a user when the support structure is worn on a head of the user, the transparent combiner comprising: a hologram with controlled side lobes comprising: a first surface; a second surface opposite the first surface; an initial set of fringes within the volume of the hologram comprising an initial fringe spacing and an initial slant angle; and at least one additional set of fringes within the volume of the hologram, wherein each additional set of fringes comprises a given additional fringe spacing and a given additional slant angle wherein each additional fringe spacing is equal to the initial fringe spacing, each additional slant angle is not equal to the initial slant angle or any other additional slant angle, the initial set of fringes and all additional sets of fringes meta-interfere, and the magnitude of Δn within the hologram varies between the first surface and the second surface; and at least one lens portion, wherein each lens portion is physically coupled to the hologram with controlled side lobes.

The intensity of each of the side lobes of the hologram may be less than one percent of the intensity of the primary hologram peak. The intensity of at least one of the side lobes of the hologram may be greater than the intensity of the primary hologram peak. The initial set of fringes and each additional set of fringes may meta-interfere most constructively at a depth through the hologram between the first surface and the second surface; the initial set of fringes and each additional set of fringes may meta-interfere at least partially destructively at the first surface; the initial set of fringes and each additional set of fringes may meta-interfere at least partially destructively at the second surface; the magnitude of Δn at the first surface may be equal to or less than 50% of the greatest magnitude of Δn within the hologram; and the magnitude of Δn at the second surface may be equal to or less than 50% of the greatest magnitude of Δn within the hologram. The initial set of fringes and each additional set of fringes may meta-interfere most destructively at a depth through the hologram between the first surface and the second surface; the initial set of fringes and each additional set of fringes may meta-interfere at least partially constructively at the first surface; the initial set of fringes and each additional set of fringes may meta-interfere at least partially constructively at the second surface; at least one of: the first surface and the second surface may possess the greatest magnitude of Δn; the minimum magnitude of Δn within the volume of the hologram may be no greater than 50% of the greatest magnitude of Δn within the hologram; and the magnitude of Δn may decrease continuously from the first surface to the minimum value of Δn within the hologram and the magnitude of Δn may decrease continuously from the second surface to the minimum value of Δn within the hologram. The hologram may comprise a wavelength-multiplexed hologram, the wavelength-multiplexed hologram comprising a blue hologram, a green hologram, a red hologram, and an infrared hologram.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
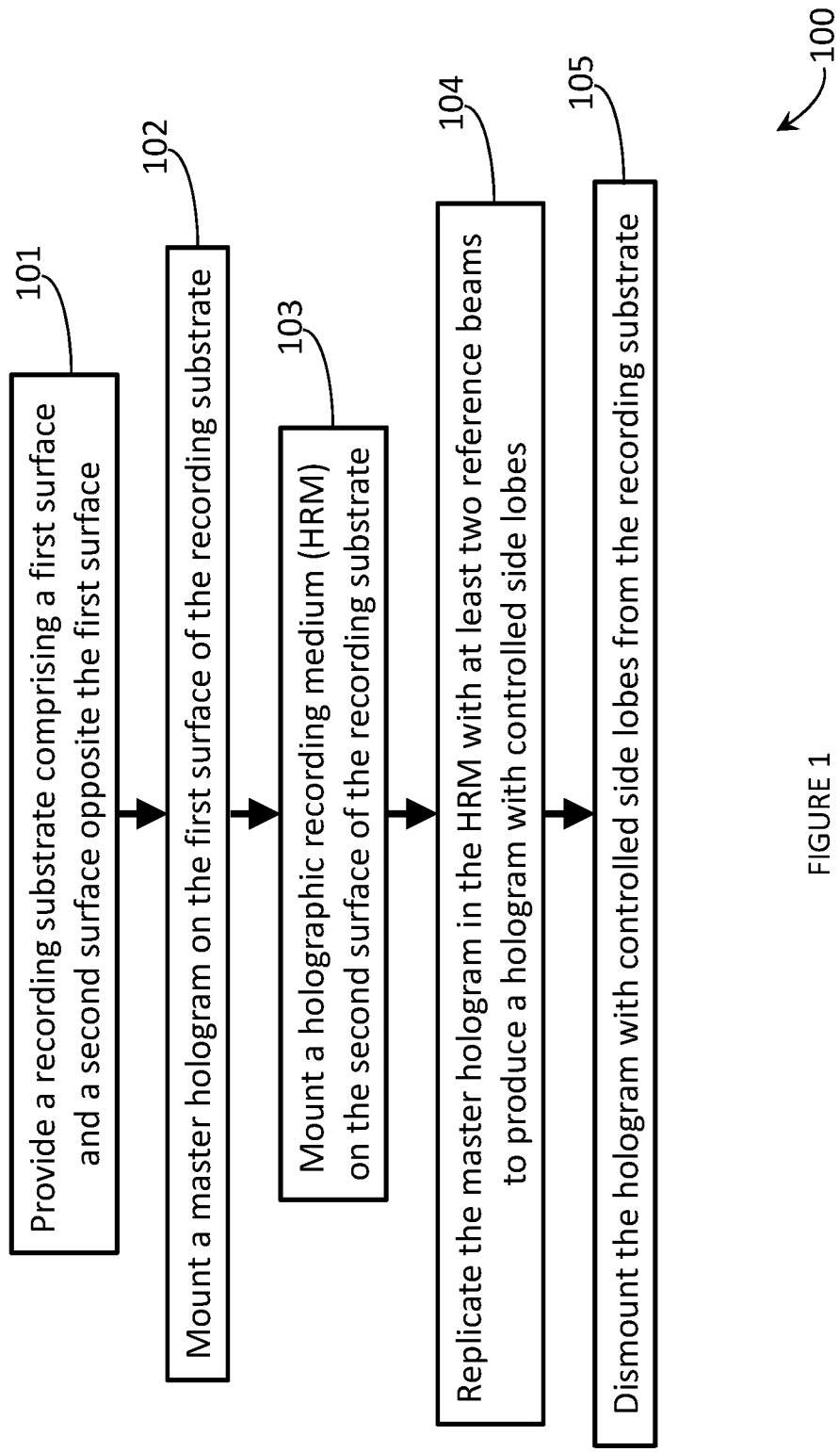
FIG. 1 is a flow-diagram showing a method of producing a hologram with controlled side lobes in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for side lobe control in holograms and are particularly well-suited for use in wearable heads-up displays (WHUDs).

A hologram is a repeating pattern of physical fringes that, when illuminated with coherent light with the same wavelength and angle as one of the lasers used to record the fringes, diffracts at least a portion of the incident light at an angle equal to the angle of the other laser used to record the physical fringes; the wavelength of the light remains unchanged. Physical fringes may comprise local maxima (or minima) of refractive index within a recorded hologram. Physical fringes are the physical structures that comprise the recorded hologram.

A holographic optical element (HOE) comprises a hologram. A HOE may comprise one or more cover sheets. A cover sheet comprises a transparent material physically coupled to a surface of the hologram, cover sheets are advantageous as they may improve the strength, durability, scratch resistance, or ease of adhesion of the HOE.

A hologram may be recorded within a holographic recording medium (HRM). A HRM comprises photosensitive material which undergoes a chemical or physical change upon exposure to light. When a HRM is exposed to a pattern of optical fringes, the photosensitive material records the pattern of optical fringes as a pattern of physical fringes. HRMs are typically physically coupled to at least one transparent support covering at least one surface of the HRM. The transparent support maintains the shape of the HRM before, during, and after hologram recording; the transparent support may also protect the HRM from damage. Non-exclusive examples of materials which may comprise a transparent support include glass, polycarbonate, polystyrene, acrylic, or other optical plastic materials.

HRMs are typically flat, planar materials with a thickness less than 0.1 mm; however, HRMs may have a thickness of up to 1 mm and may be curved. A curved surface may be a spherically curved surface; a spherically curved surface is curved around a center of curvature. A curved surface may be a cylindrically curved surface; a cylindrically curved surface is curved around an axis of curvature. The center or axis of curvature, as appropriate, of the HRM may be located at a distance of between 1 and 10 centimeters, between 10 and 50 cm, or between 50 and 100 cm from the surface of the HRM.

A side lobe in a hologram is a local maximum adjacent to the primary peak in a plot of hologram efficiency versus either wavelength or angle of incidence. Side lobes may arise from the sharp difference in refractive index modulation ($\Delta n$) between where the hologram is recorded within the HOE and where the hologram is not recorded within the transparent support. $\Delta n$ (i.e., refractive index modulation) is the difference between the highest and lowest refractive indices in a recorded hologram.

In a typical hologram, $\Delta n$ as a function of depth through the hologram can be described by a square-wave function. Within a hologram, depth is the distance from a surface of the hologram to a point within the hologram measured in the z direction, where the z direction is normal to the surface of the plane, cylinder, or sphere of the hologram film (for planar, cylindrical, and spherical holograms, respectively).

Since the efficiency of the hologram with respect to either wavelength or angle is the Fourier transform of $\Delta n$ as a function of depth, the efficiency response of a typical hologram is the Fourier transform of a square wave function. A sinc function (an abbreviation of "sine cardinal function") is a mathematical function that describes the Fourier transform of a square wave function; a sinc squared function is the square of a sinc function. A sinc squared function possesses a primary peak and multiple side lobes, therefore a hologram with a $\Delta n$ profile equivalent to a square-wave function also has side lobes.

The presence of side lobes in a hologram may create a number of potential problems. A hologram recorded at a particular wavelength will be responsive to wavelengths outside the desired primary playback wavelength and therefore produce playback light when illuminated with light with a wavelength higher or lower than the wavelength used to record the hologram. Playback is the process of illuminating a hologram with light that replicates the reference beam in order to replicate the object beam. The reference beam is one of the laser beams used to record the hologram, the object beam is another laser used to record the hologram.

For example, a hologram recorded with green laser light could produce playback light when illuminated with blue laser light if the blue laser light is of a wavelength corresponding to one of the side lobes of the hologram recorded with green laser light; the same green hologram may also produce playback light when illuminating the hologram with red laser light matching another side lobe of the green hologram. The playback light produced by the side lobes will have a different playback angle than the playback light produced by the primary peak.

The creation of additional playback beams at multiple angles due to side lobes is problematic when a hologram is used in a holographic display, including a holographic WHUD. If the additional playback beams are able to enter the eye of the user, the additional playback beams create secondary visible images displaced in space from the primary image being produced by the display. These additional images are typically lower in intensity than the main image and are referred to as "ghost images". Ghost images may reduce the resolution of the display by blurring any images produced by the display, and ghost images may also occlude the primary images of the display if the ghost image produced by one portion of the primary image overlaps another portion of the primary image.

Ghost image formation may be reduced or eliminated by reducing or eliminating, respectively, the presence of side lobes in the hologram. Softening the edges of the $\Delta n$ profile as a function of depth reduces the strength of the side lobes. Apodizing the $\Delta n$ profile as a function of depth significantly reduces or eliminates the presence of side lobes. An apodized hologram is a hologram with a minimum value of Δn at both the maximum and minimum depth of the hologram, a maximum value of Δn at some intermediate depth of the hologram, and no observable local maxima or minima of Δn through the depth of the hologram. Alternatively, if side lobes are desired, the side lobes could be accentuated by anti-apodizing the Δn profile as a function of depth.

A hologram with controlled side lobes comprises a hologram with side lobes that differ from the side lobes present in a hologram recorded with a single reference beam; in other words a hologram with controlled side lobes comprises a hologram with side lobes that are either greater or lesser in magnitude than the side lobes described by a sinc function.

Described herein is a method of producing holograms with controlled side lobes, the resulting holograms, and components, systems, and devices comprising holograms with controlled side lobes.

FIG. 1 is a flow-diagram showing a method 100 of producing a hologram with controlled side lobes 100 in accordance with the present systems, devices, and methods. Method 100 includes five acts 101, 102, 103, 104, and 105 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 101, a recording substrate is provided. The recording substrate comprises a first surface and a second surface. A master hologram is a recorded hologram that may be used repeatedly to replicate a hologram in a second (or copy) holographic recording medium (HRM). Replication is the process of recording a copy hologram using a master and includes contact and non-contact copying, with contact copying being more typically used for mass production. In contact copying, the master is affixed to a first surface of a recording substrate.

A recording substrate is an inflexible transparent substrate that defines the shape of a hologram during recording. Typical recording substrates are flat and planar, however recording substrates may be at least partially spherically curved and/or at least partially cylindrically curved; typical recording substrate materials include glass and polycarbonate. A HRM is affixed to a second surface of the recording substrate, where the second surface is opposite the first surface. A reference beam is passed through the HRM, the substrate, and the master. The master diffracts at least a portion of the reference beam to produce a diffracted object beam. The diffracted object beam and the reference beam interfere within the HRM, recording a hologram within the HRM that is substantively similar to the hologram recorded within the master.

Contact copying is advantageous because the minimal distance between the master and the copy ensures that the path length difference between the reference beam and diffracted object beam is very small, allowing the use of less expensive laser light sources with shorter coherence lengths. Since contact copying includes physically coupling the master and copy hologram to the same substrate, motion of the copy hologram relative to the master hologram during recording is essentially eliminated and stringent vibration control is no longer needed.

At 102, a master hologram is mounted on the first surface of the recording substrate. Mounting the master hologram on the recording substrate includes physically coupling the master hologram to the first surface of the recording substrate.

At 103, a HRM is mounted on the recording substrate. Mounting the HRM on the recording substrate includes physically coupling the HRM to the second surface of the recording substrate, wherein the second surface of the recording substrate is opposite the first surface of the recording substrate.

At 104, the master hologram is replicated within the HRM with at least two reference beams to produce a hologram with controlled side lobes. The at least two reference beams may each be of a different wavelength than each other reference beam. The at least two reference beams may each be of a different angle than each other reference beam.

Replicating the master hologram within the HRM with at least two reference beams to produce a hologram with controlled side lobes may include replicating the master hologram within the HRM with at least two reference beams to produce a hologram wherein the intensity of the side lobes is less than 25%, less than 10%, or less than one percent of the intensity of the primary hologram peak. Side lobes with minimal intensity relative to the primary hologram peak may be produced by apodizing the distribution of Δn as a function of depth within the hologram. Replicating the master hologram within the HRM with at least two reference beams to produce a hologram with controlled side lobes may include replicating the master hologram within the HRM with at least two reference beams to produce a hologram wherein the intensity of at least one of the side lobes is at least 25% of, at least 50% of, or greater than the intensity of the primary hologram peak. Side lobes with maximal intensity relative to the primary hologram peak may be produced by anti-apodizing the distribution of Δn as a function of depth within the hologram.

Replicating the master hologram with at least two reference beams will produce at least two diffracted object beams; each of the at least two diffracted object beams will interfere with each of the at least two reference beams to produce at least two sets of optical fringes (at least a portion of each set of optical fringes is located within an internal volume of the HRM). The light diffracted by the master hologram follows the diffraction grating equation:

$$\frac{\lambda}{n\Lambda} = \sin\theta_1 - \sin\theta_2$$

where λ is the wavelength of the laser light, Λ is the lateral grating spacing (of the optical fringes), $\theta_1$ is the angle of incidence (relative to the normal), $\theta_2$ is the angle of diffraction (relative to the normal), and n is an integer. The lateral spacing of the fringes produced by interference between incident light and any light produced by the master hologram will be the same; any changes in incident wavelength or angle will affect the angle of the diffracted light (and therefore the angle of the resulting fringes) but not the spacing of the resulting fringes. The fringe spacing is always the same when replicating a single master with two laser beams, thus the at least two sets of optical fringes will both possess the same fringe spacing as the master hologram. The at least two sets of optical fringes may be recorded within the HRM to form at least two sets of physical fringes.

In other words, replicating the master hologram with at least two reference beams includes illuminating the HRM and the master hologram with at least two reference beams;

during replication the master hologram and the HRM are separated from one another by the recording substrate. Replicating the master hologram within the HRM includes passing each reference beam through the HRM, the recording substrate, and the master hologram. Replicating a transmission hologram includes passing each reference beam through the master hologram prior to passing each reference beam through the HRM. Replicating a reflection hologram includes passing each reference beam through the HRM prior to passing each reference beam through the master hologram.

Replication may include recording a pattern of fringes within HRM that is substantively similar to the pattern of fringes within the master hologram. During replication, each reference beam possesses a phase within the HRM and each object beam possesses a phase within the HRM. Both the reference beam and the object beam must pass through the recording substrate, but the path length through the recording substrate of the reference beam is not necessarily equal to the path length through the recording substrate of the object beam. The difference in path length between the object beam and the reference beam causes a phase shift between the object beam and the reference beam within the HRM. The phase of the optical fringes produced by interference between the object beam and the reference beam within the HRM depends on the phase shift between the object beam and the reference beam.

Throughout this specification and the appended claims, the term "meta-interference" refers to interference between sets of fringes; each set of fringes may be the product of interference between each reference beam and the respective object beam diffracted from each reference beam. Replicating the master hologram within the HRM with at least two reference beams produces at least two sets of optical fringes that undergo meta-interference. The meta-interference of the at least two sets of optical fringes increases $\Delta n$ in regions of constructive meta-interference and decreases $\Delta n$ in regions of destructive meta-interference. The magnitude of the increase or decrease in $\Delta n$ depends on the magnitude of the constructive or destructive meta-interference, respectively. The position of the increased or decreased $\Delta n$ within the HRM depends on the net phase shift of each set of fringes, where the net phase shift of a set of optical fringes is the relative difference in phase between that set of optical fringes and another set of optical fringes within the HRM.

Control over the side lobes of a hologram requires control over the positions of high and low $\Delta n$ within the HRM. Control over the positions of high and low $\Delta n$ within the HRM may be achieved by controlling the precise angle and wavelength of each reference beam employed during replication. The angle and wavelength of each reference beam determines the phase shift of each object beam, and therefore the phase of each set of optical fringes, the net phase shift between each set of optical fringes, the meta-interference between sets of optical fringes, and thereby the positions of high and low $\Delta n$ within the HRM.

Figure 2:
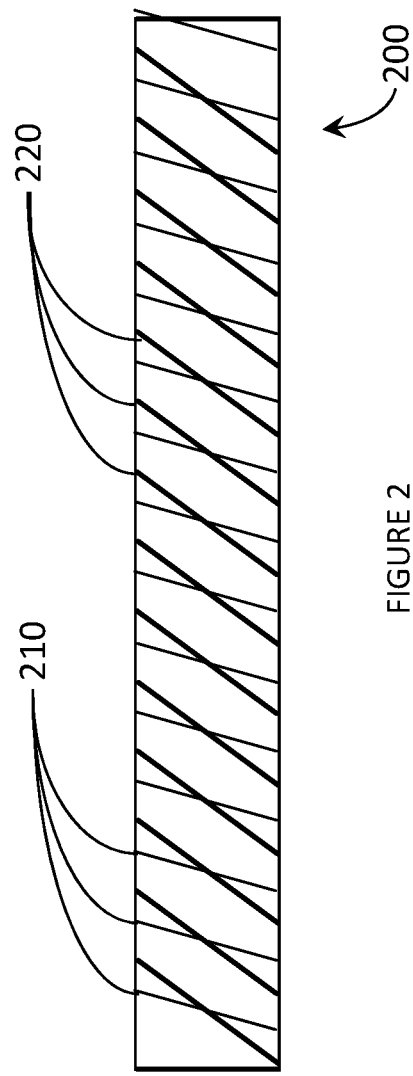
FIG. 2 is a cross-sectional view of hologram with controlled side lobes in accordance with the present systems, devices, and methods.

Consider FIG. 2, which shows a cross-sectional view of hologram with controlled side lobes 200 in accordance with the present systems, devices, and methods. Hologram with controlled side lobes 200 may be produced by method 100. Hologram with controlled side lobes 200 comprises first set of fringes 210 and second set of fringes 220. First set of fringes 210 and second set of fringes 220 may be formed by replicating a master hologram with two reference beams. First set of fringes 210 and second set of fringes 220 have the same spacing but different angles, which causes first set of fringes 210 and second set of fringes 220 to interfere with each other. At the top and bottom surface of hologram with controlled side lobes 200 first set of fringes 210 and second set of fringes 220 interfere destructively, reducing $\Delta n$ to a minimum. At the middle depth of hologram with controlled side lobes 200 first set of fringes 210 and second set of fringes 220 interfere constructively, increasing $\Delta n$ to a maximum. $\Delta n$ increases smoothly from either surface of the hologram towards the maximum. Hologram with controlled side lobes 200 is therefore apodized and will have minimal, if any, side lobes. In order to achieve this smooth interference between sets of fringes with a maximum $\Delta n$ at a desired depth, the sets of fringes must have precisely matched spacing and phase.

First set of fringes 210 may comprise an initial set of fringes. Second set of fringes 220 may comprise an additional set of fringes. A person of skill in the art will appreciate that for the sake of clarity only two sets of fringes are depicted in Figure two, however hologram with controlled side lobes 200 may comprise n sets of fringes (where n is equal to or greater than 2) with one initial set of fringes and n−1 additional sets of fringes, the various sets of fringes having different angles and, or different phase shifts from those of the other sets of fringes.

In some implementations, hologram 200 may be carried on or by another structure, and such other structure may, for example, provide at least some additional optical function. For instance, one or more holograms may be carried on or by a waveguide or lightguide structure and may serve as, for example, an in-coupler, out-coupler, or exit pupil expander for such waveguide or lightguide structure. Thus, for the purposes of the present systems, device, and methods, including the appended claims, the term "hologram" may include a HRM layer and a combination of optional additional layers or structures such as protective material, waveguide/lightguide structures, substrates, etc. depending on the specific implementation. Likewise, when the term "hologram with controlled side lobes" is used, said hologram with controlled side lobes may be carried on or by other structures or layers, or may itself carry other structures or layers, depending on the specific implementation.

Returning to FIG. 1, replicating the master hologram within the HRM with at least two reference beams to produce a hologram with controlled side lobes may include replicating a wavelength-multiplexed master hologram with at least two reference beams to produce a wavelength-multiplexed hologram with controlled side lobes. A wavelength-multiplexed hologram is a hologram comprising multiple wavelength-specific holograms. Each wavelength-specific hologram comprising a wavelength-multiplexed hologram diffracts laser light of a specific wavelength; a wavelength-specific hologram cannot diffract light of a wavelength outside of the spectral bandwidth of the wavelength-specific hologram. Wavelength-multiplexed holograms are advantageous since a wavelength-multiplexed hologram may be employed as a holographic combiner in a WHUD with a full-color display; single-wavelength holograms may be employed in monochromatic displays.

A wavelength-multiplexed master hologram may be replicated to produce a wavelength-multiplexed hologram with controlled side lobes. A wavelength-multiplexed master hologram may comprise a blue master hologram, a green master hologram, and a red master hologram. A wavelength-multiplexed hologram with controlled side lobes may comprise a blue hologram with controlled side lobes, a green hologram with controlled side lobes, and a red hologram with controlled side lobes. A wavelength-multiplexed hologram with controlled sidelobes may be replicated from a wavelength-multiplexed master hologram with at least two blue beams of laser light, at least two green beams of laser light, and at least two red beams of laser light. Each beam of laser light used to replicate a wavelength-multiplexed hologram with controlled sidelobes from a wavelength-multiplexed possesses a respective wavelength.

A blue wavelength-specific hologram with controlled sidelobes comprising a wavelength-multiplexed hologram with controlled sidelobes may be replicated from a wavelength-multiplexed master with two blue beams of laser light, where the two blue beams of laser light differ in wavelength by a first $\Delta\lambda$. A green wavelength-specific hologram with controlled sidelobes comprising a wavelength-multiplexed hologram with controlled sidelobes may be replicated from a wavelength-multiplexed master with two green beams of laser light, where the two green beams of laser light differ in wavelength by a second $\Delta\lambda$. A red wavelength-specific hologram with controlled sidelobes comprising a wavelength-multiplexed hologram with controlled sidelobes may be replicated from a wavelength-multiplexed master with two red beams of laser light, where the two red beams of laser light differ in wavelength by a third $\Delta\lambda$. The first $\Delta\lambda$ may be greater than, less than, or equal to the second $\Delta\lambda$. The second $\Delta\lambda$ may be greater than, less than, or equal to the third $\Delta\lambda$. A wavelength-multiplexed hologram with controlled side lobes, where each wavelength-specific hologram has the same intensity of side lobes relative to the intensity of the primary hologram peak, may be replicated when the first $\Delta\lambda$ is highest and the third $\Delta\lambda$ is lowest.

The master hologram possesses a Bragg peak wavelength. Each reference beam possesses a reference beam wavelength. Replicating the master hologram within the HRM with at least two reference beams to produce a hologram with controlled side lobes may include replicating the master hologram within the HRM with at least two reference beams to produce a hologram with controlled side lobes wherein the difference between the Bragg peak wavelength of the master hologram and reference beam wavelength of each reference beam is less than 2 nanometers. Replicating the master hologram with a reference beam wherein the difference between the Bragg peak wavelength of the master hologram and the reference beam wavelength is small is advantageous since the efficiency of the master hologram may decrease significantly at wavelengths greater than 2 nanometers from the Bragg peak wavelength of the master hologram. Significant changes in master hologram efficiency may cause significant changes in the phase of any laser light diffracted by the master hologram, and therefore make it difficult to control the phase of the initial set of optical fringes and the net phase shift of the additional sets of optical fringes within the HRM.

The bandwidth of a hologram is the range of angles and wavelengths of incident laser light that the hologram efficiently diffracts; bandwidth includes angular bandwidth and wavelength bandwidth. The angular bandwidth of a hologram is the range of angles of incident laser light that satisfies the Bragg condition for the hologram and therefore may be efficiently diffracted by the hologram. The wavelength bandwidth of a hologram is the range of wavelengths of incident laser light that satisfies the Bragg condition for the hologram and therefore may be efficiently diffracted by the hologram. Typically, a hologram with a narrow angular bandwidth also possesses a narrow wavelength bandwidth and a hologram with a broad angular bandwidth also possesses a broad wavelength bandwidth. Any process that increases or decreases the angular bandwidth of a hologram will typically also proportionally increase or decrease (respectively) the wavelength bandwidth of a hologram. A person of skill of art will appreciate that the term "bandwidth" therefore may refer either to the angular bandwidth or the wavelength bandwidth of a hologram unless otherwise specified as "angular bandwidth" or "wavelength bandwidth". Each wavelength-specific hologram comprising a wavelength-multiplexed hologram possesses its own bandwidth. In other words, for a wavelength-multiplexed hologram comprising a blue hologram, a green hologram, and a red hologram, the bandwidth of the blue hologram may be greater than or less than the bandwidth of the green hologram, and the bandwidth of the green hologram may be greater than or less than the bandwidth of the red hologram. The phase shift introduced to the diffracted object beam by the master hologram due to the thickness of the master hologram depends on the bandwidth of the master hologram. A hologram with broader bandwidth will have a weaker dependence of phase shift on hologram thickness; varying the bandwidth of the wavelength-specific holograms allows further control of the phase shift of the respective diffracted object beams and therefore the side lobes of the resulting holograms.

Replicating the master hologram within the HRM with at least two reference beams to produce a hologram with controlled side lobes may include replicating the master hologram with at least two reference beams to record an initial set of fringes and at least one additional set of fringes within the HRM. The initial set of fringes possesses a phase within the HRM. Each additional set of fringes possesses a net phase shift relative to the initial set of fringes within the HRM. The net phase shift between each additional set of fringes and the initial set of fringes controls the meta-interference between each additional set of fringes and the initial set of fringes.

A person of skill in the art will appreciate that defining a particular set of fringes as being an initial set of fringes (while all other sets of fringes are additional fringes) is advantageous as such a definition establishes a common frame of reference for determining the phase of each set of fringes relative to each other set of fringes. A determination of the relative phase of each set of fringes may eliminate the need to determine the absolute phase of any set of fringes.

Each set of fringes (initial or additional) will meta-interfere with each other set of fringes within the HRM. Constructive meta-interference between sets of fringes increases $\Delta n$, while destructive meta-interference between sets of fringes decreases $\Delta n$. The locations within the HRM where fringes meta-interfere constructively or destructively depends on the phase of the initial set of fringes within the HRM and the net phase shift of the at least one additional set of fringes within the HRM. The net phase shift of each additional set of fringes may be expressed in radians. The net phase shift of each additional set of fringes may be measured at a depth within the hologram equidistant from the first surface and the second surface of the HRM. A net phase shift of 0 will result in maximum constructive meta-interference at a depth within the hologram equidistant from the first surface and the second surface of the HRM and maximum destructive meta-interference at the first surface and at the second surface; in other words, a net phase shift of 0 will produce an apodized hologram with minimized side lobes. A net phase shift of $\pi$ will result in maximum destructive meta-interference at a depth within the hologram equidistant from the first surface and the second surface of the HRM and maximum constructive meta-interference at the first surface and at the second surface; in other words, a phase shift of $\pi$ will produce an anti-apodized hologram with maximized side lobes.

Factors that determine the phase of the initial set of fringes within the HRM include: the thickness of the recording substrate, the refractive index of the recording substrate, the thickness of the master hologram, the bandwidth of the master hologram, the angle of the reference beam diffracted by the master hologram to produce the initial set of fringes, and the wavelength of the reference beam diffracted by the master hologram to produce the initial set of fringes. Factors that determine the net phase shift of each additional set of fringes within the HRM include: the thickness of the recording substrate, the refractive index of the recording substrate, the thickness of the master hologram, the bandwidth of the master hologram, the angle of the reference beam diffracted by the master hologram to produce each additional set of fringes, and the wavelength of the reference beam diffracted by the master hologram to produce each additional set of fringes.

Control over the side lobes of a hologram may be achieved by controlling the factors that determine the phase of the initial set of fringes within the HRM and by controlling the factors that determine the net phase shift of each set of additional fringes within the HRM. The thickness of the recording substrate may be controlled by casting, milling, cutting, grinding, or otherwise producing a recording substrate with a desired thickness. The refractive index of the recording substrate may be controlled by choosing a recording substrate material with a desired refractive index. The thickness of the master hologram may be controlled by recording the master hologram in a HRM with a desired thickness. The bandwidth of the master hologram may be controlled by controlling the thickness of the master hologram, where thicker master holograms typically have a narrower bandwidth. The bandwidth of the master hologram may be increased with bandwidth-broadening treatments. The angle of a reference beam may be controlled by positioning the laser light source for a given reference beam at a desired angle. The wavelength of a reference beam may be controlled by choosing a laser light source with appropriate wavelength outputs; laser light sources with variable wavelength outputs may have their output wavelength determined by the conditions under which the variable output laser light source is operated.

A hologram with apodized $\Delta n$ will have side lobes with the least magnitude, and thereby comprises a hologram with controlled side lobes. A hologram with apodized $\Delta n$ comprises a hologram wherein $\Delta n$ is lowest at the shallowest and deepest depth within the hologram and wherein $\Delta n$ is highest at a depth between the shallowest and deepest depth within the hologram. In other words, $\Delta n$ is lowest at the first and second surface of the hologram and $\Delta n$ is highest at a depth between the first and second surface. A hologram with anti-apodized $\Delta n$ will have side lobes with the greatest magnitude, and thereby comprises a hologram with controlled side lobes. A hologram with anti-apodized $\Delta n$ comprises a hologram wherein $\Delta n$ is highest at the shallowest and deepest depth within the hologram and wherein $\Delta n$ is lowest at a depth between the shallowest and deepest depth within the hologram. In other words, $\Delta n$ is highest at the first and second surface of the hologram and $\Delta n$ is lowest at a depth between the first and second surface.

Typically, a master hologram with a given thickness and bandwidth is used in combination with a recording substrate with a given thickness and refractive index (in accordance with the present systems, devices, and methods). The wavelength and angle of the reference beam diffracted by the master hologram to produce the initial set of fringes within the HRM is fixed to achieve a desired playback wavelength and angle for the recorded hologram. The wavelength and angle of each reference beam diffracted by the master hologram to record each additional set of fringes is then fixed to achieve the necessary net phase shift for each additional set of fringes, such that the interference between the initial set of fringes and each additional set of fringes within the HRM will produce variations of $\Delta n$ within the HRM that give the desired magnitude of side lobes relative to the main peak of the hologram with controlled side lobes.

A reference beam comprises laser light. A reference beam may comprise a plane wave, wherein a plane wave comprises laser light with parallel wave fronts. A plane wave does not converge to a point and a plane wave does not diverge from a point. A plane wave may be generated by collimating laser light, wherein collimating laser light may include reflecting laser light with a mirror or refracting laser light with a lens. A hologram recorded with a plane wave will have the most parallel fringes; in other words, the slant angle of the fringes will have minimal change throughout the hologram. Recording a hologram with a plane wave may therefore be advantageous since the distribution of $\Delta n$ as a function of depth within the resulting hologram will be the most consistent across the lateral dimensions of the hologram.

A reference beam may comprise a spherical wave, wherein a spherical wave comprises laser light with spherically curved wave fronts; the curvature of the wave fronts includes a focal point. A spherical wave either converges to a focal point or diverges from a focal point. A spherical wave may be generated by focusing laser light with a converging lens or a converging mirror; a spherical wave may be generated by defocusing laser light with a diverging lens or a diverging mirror. Recording a hologram with a spherical wave may be advantageous since the recorded hologram will possess an optical power and therefore the recorded hologram may focus (or defocus) light in addition to any other optical functions the recorded hologram performs. A hologram recorded with a spherical wave will not have perfectly parallel fringes; in other words, the slant angle of the fringes will not be exactly the same throughout the lateral dimensions of the hologram. However, the difference in slant angle between fringes does not affect the magnitude of the side lobes of the hologram so long as the focal point of the spherical wave(s) is (are) at a distance from the hologram equal to at least 50%, at least 100%, or at least 200% of the largest lateral dimension of the hologram with controlled side lobes. Increasing the focal distance (relative to the size of the hologram) decreases the difference in slant angle between fringes, bringing the fringes of a hologram recorded with a spherical wave closer to parallel.

Figure 3A:
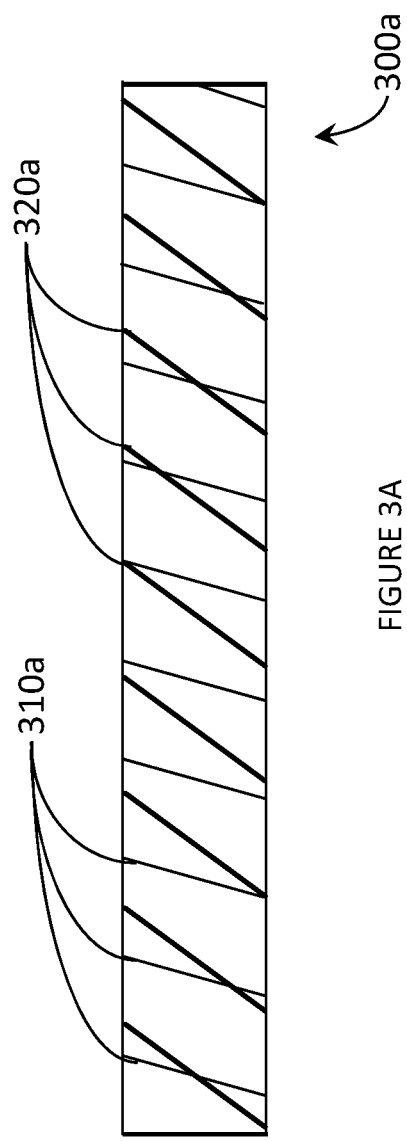
FIG. 3A is a cross-sectional view of hologram with unmatched fringe spacing in accordance with the present systems, devices, and methods.

Consider FIG. 3A, which shows a cross-sectional view of hologram with unmatched fringe spacing 300a in accordance with the present systems, devices, and methods. Hologram with unmatched fringe spacing 300a comprises first set of fringes 310a and second set of fringes 320a, where the spacing of first set of fringes 310a is less than the spacing of second set of fringes 320a. Hologram with unmatched fringe spacing 300a comprises a hologram with anti-apodized $\Delta n$. Because the spacings of first set of fringes 310a and second set of fringes 320a do not match, the depth of maximum constructive interference, and therefore the depth of maximum $\Delta n$, will vary throughout the hologram laterally.

Figure 3B:
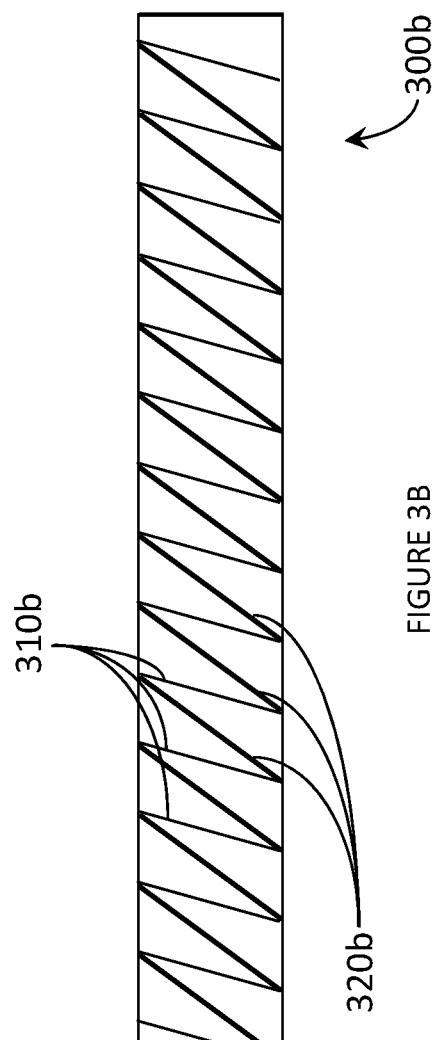
FIG. 3B is a cross-sectional view of hologram with unmatched phase in accordance with the present systems, devices, and methods.

Consider FIG. 3B, which shows a cross-sectional view of hologram with unmatched phase 300b in accordance with the present systems, devices, and methods. Hologram with unmatched phase 300b comprises first set of fringes 310b and second set of fringes 320b. The phase of first set of fringes 310b and second set of fringes 320b combine such that first set of fringes 310b and second set of fringes 320b interfere constructively at the highest and lowest depth of hologram with unmatched phase 300b and interfere destructively at the middle depth of hologram with unmatched phase 300b. Δn within hologram with unmatched phase 300b is therefore at a maximum at the highest and lowest depth of hologram with unmatched phase 300b and at a minimum at the middle depth of hologram with unmatched phase 300b; hologram with unmatched phase 300b is therefore anti-apodized and would show the strongest possible side lobes. This is advantageous if strong side lobes are desirable, however it is disadvantageous if minimal side lobes are desirable. Therefore, the phase of the diffracted object beams must be controlled during replication.

Returning to FIG. 1, at 105, the hologram with controlled side lobes is dismounted from the recording substrate. Dis-mounting the hologram with controlled side lobes from the recording substrate includes physically de-coupling the hologram with controlled side lobes from the recording substrate.

Method 100 may further comprise bleaching the hologram with controlled side lobes. Bleaching includes exposing the hologram with controlled side lobes to a bleaching agent. Non-exclusive examples of a bleaching agents include acids, peroxides, hypochlorites, and light. Photobleaching includes exposing the hologram with controlled side lobes to light. The light used for photobleaching may be incoherent. The light used for photobleaching may be polychromatic, wherein at least a portion of the light which is used for photobleaching may be absorbed by the photoinitiator or the monomer within the hologram with controlled side lobes.

Photobleaching the hologram with controlled side lobes converts at least a portion of the hologram with controlled side lobes from a photopolymerizable material to a material that is not photopolymerizable.

Method 100 may further comprise recording a master hologram. Recording a master hologram may include illuminating a master HRM with an object beam and a reference beam.

Figure 4:
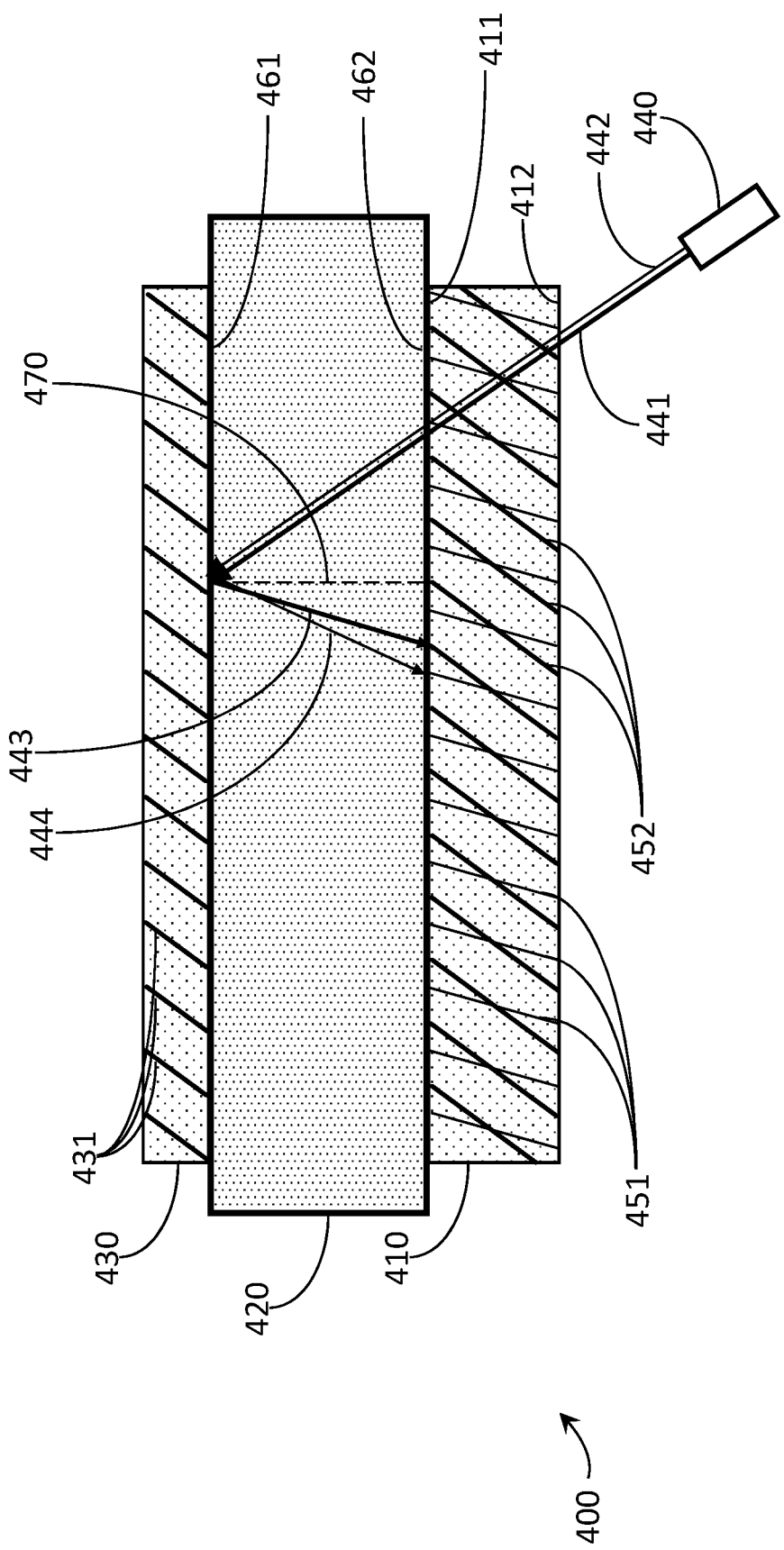
FIG. 4 is a cross-sectional view of hologram with controlled side lobes recording system in accordance with the present systems, devices, and methods.

FIG. 4 is a cross-sectional view of hologram with controlled side lobes recording system 400 in accordance with the present systems, devices, and methods. Although FIG. 4 is a cross-sectional view, a dot-fill pattern has been used to differentiate various elements in FIG. 4 rather than a cross-hatch pattern to avoid confusion between the diagonal lines denoting fringes and diagonal lines denoting cross-hatching.

Hologram with controlled side lobes recording system 400 comprises copy HRM 410, recording substrate 420, master hologram 430, laser light source 440, first reference beam 441, second reference beam 442, first diffracted object beam 443, and second diffracted object beam 444. Hologram with controlled side lobes recording system 400 may be employed to produce a hologram substantively similar to hologram with controlled side lobes 200 via method of producing a hologram with controlled side lobes 100.

Copy HRM 410 comprises first copy HRM surface 411 and second copy HRM surface 412. Recording substrate 420 comprises master-side surface 461 and copy HRM-side surface 462. Master hologram 430 is physically coupled to master-side surface 461 of recording substrate 420, while first copy HRM surface 411 of copy HRM 410 is physically coupled to copy HRM-side surface 462 of recording substrate 420.

Laser light source 440 produces first reference beam 441 and second reference beam 442. First reference beam 441 may be of a different wavelength than second reference beam 442. First reference beam 441 may be of a different angle than second reference beam 442. First reference beam 441 and second reference beam 442 impinge on master hologram 430. Master hologram 430 comprises master hologram fringes 431. Master hologram fringes 431 diffract first reference beam 441 and second reference beam 442 to produce first diffracted object beam 443 and second diffracted object beam 444. Master hologram 430 produces first diffracted object beam 443 from first reference beam 441 and produces second diffracted object beam 444 from second diffracted object beam 444. First diffracted object beam 443 and first reference beam 441 interfere to produce initial set of optical fringes 451. Second diffracted object beam 444 and second reference beam 442 interfere to produce additional set of optical fringes 452.

Initial set of optical fringes 451 and additional set of optical fringes 452 meta-interfere with each other within copy HRM 410. Constructive meta-interference between initial set of optical fringes 451 and additional set of optical fringes 452 causes an increase in Δn in the physical fringes recorded from the optical fringes, while destructive meta-interference between initial set of optical fringes 451 and additional set of optical fringes 452 causes a decrease in Δn in the physical fringes recorded from the optical fringes. The depth within copy HRM 410 at which constructive or destructive meta-interference between initial set of optical fringes 451 and additional set of optical fringes 452 occurs depends on the phase of the initial set of optical fringes 451 relative to the additional set of optical fringes 452.

First reference beam 441 will have a given phase at copy HRM-side surface 462. First diffracted object beam 443 will have a phase at copy HRM-side surface 462 that depends on the phase of first reference beam 441 at copy HRM-side surface 462 and the effective distance traveled by the light comprising first diffracted object beam 443. The effective distance traveled by the light comprising first diffracted object beam 443 depends on the thickness and refractive index of recording substrate 420. The difference in phase between first reference beam 441 and first diffracted object beam 443 at HRM-side surface 462 is the phase shift of first diffracted object beam 443.

Second reference beam 442 will have a given phase at copy HRM-side surface 462. Second diffracted object beam 444 will have a phase at copy HRM-side surface 462 that depends on the phase of second reference beam 442 at copy HRM-side surface 462 and the effective distance traveled by the light comprising second diffracted object beam 444. The effective distance traveled by the light comprising second diffracted object beam 444 depends on the thickness and refractive index of recording substrate 420. The difference in phase between second reference beam 442 and second diffracted object beam 444 at HRM-side surface 462 is the phase shift of second diffracted object beam 444.

The difference between the phase shift of second diffracted object beam 444 and the phase shift of first diffracted object beam 443 is the net phase shift of second diffracted object beam 444. The phase of initial set of optical fringes 451 depends on the phase shift of first diffracted object beam 443. The phase of additional set of optical fringes 452 depends on the phase shift of second diffracted object beam 444. The difference in phase between additional set of optical fringes 452 and initial set of optical fringes 451 is the net phase shift of additional set of optical fringes 452. The net phase shift of additional set of optical fringes 452 depends on the net phase shift of second diffracted object beam 444.

The net phase shift of additional set of optical fringes 452 determines the location of constructive and destructive interference of initial set of optical fringes 451 and additional set of optical fringes 452. The net phase shift of additional set of optical fringes 452 may be measured in radians at a depth within copy HRM 410 equidistant between first copy HRM surface 411 and second copy HRM surface 412. If the net phase shift of additional set of optical fringes 452 is 0, then meta-interference between initial set of optical fringes 451 and additional set of optical fringes 452 will be most constructive at a depth within copy HRM 410 equidistant between first copy HRM surface 411 and second copy HRM surface 412 and most destructive at depths closest to first copy HRM surface 411 and second copy HRM surface. If the net phase shift of additional set of optical fringes 452 is π, then meta-interference between initial set of optical fringes 451 and additional set of optical fringes 452 will be most destructive at a depth within copy HRM 410 equidistant between first copy HRM surface 411 and second copy HRM surface 412 and most constructive at depths closest to first copy HRM surface 411 and second copy HRM surface.

If first reference beam 441 and the second reference beam 442 comprise light of differing angles with the same wavelength, first reference beam 441 and second reference beam 442 will travel different paths to reach master hologram 430, and first diffracted object beam 443 and second diffracted object beam 444 will travel different paths to reach copy HRM 410. The effective distance traveled by first diffracted object beam 443 and second diffracted object beam 444 will be different. The effective distance traveled by first diffracted object beam 443 is equivalent to a first number of wavelengths of first diffracted object beam 443. The effective distance traveled by second diffracted object beam 444 is equivalent to a second number of wavelengths of second diffracted object beam 444. Due to the different effective distances traveled, the first number of wavelengths of first diffracted object beam 443 is not equal to the second number of wavelengths of second diffracted object beam 444, and the difference between the first number of wavelengths of first diffracted object beam 443 and the second number of wavelengths of second diffracted object beam 444 is the net phase shift of second diffracted object beam 444. The difference between the first number of wavelengths of first diffracted object beam 443 and the second number of wavelengths of second diffracted object beam 444 depends on the thickness and the refractive index of recording substrate 420 since the difference in effective distance traveled depends on the thickness of recording substrate 420. Therefore, the net phase shift of second diffracted object beam 444 will be determined by the thickness and refractive index of recording substrate 420.

If first reference beam 441 and the second reference beam 442 comprise light of differing wavelengths with the same angle, the net phase shift of second diffracted object beam 444 will be determined by the thickness and refractive index of recording substrate 420. First reference beam 441 and second reference beam 442 will travel identical paths to reach master hologram 430, and first diffracted object beam 443 and second diffracted object beam 444 will travel identical paths to reach copy HRM 410. The effective distance traveled by first diffracted object beam 443 and second diffracted object beam 444 will be identical. The effective distance traveled by first diffracted object beam 443 is equivalent to a first number of wavelengths of first diffracted object beam 443. The effective distance traveled by second diffracted object beam 444 is equivalent to a second number of wavelengths of second diffracted object beam 444. The first number of wavelengths of first diffracted object beam 443 is not equal to the second number of wavelengths of second diffracted object beam 444, and the difference between the first number of wavelengths of first diffracted object beam 443 and the second number of wavelengths of second diffracted object beam 444 is the net phase shift of second diffracted object beam 444; the difference between the first number of wavelengths of first diffracted object beam 443 and the second number of wavelengths of second diffracted object beam 444 depends on the thickness and the refractive index of recording substrate 420.

For a desired location of maximum constructive interference, a thickness of recording substrate 420 may be calculated for the specific wavelengths of the first sub-beam of laser light and the second sub-beam of laser light at a given angle. In this manner, the phase of the light comprising initial set of optical fringes 451 and additional set of optical fringes 452 may be controlled; by extension the interference between initial set of optical fringes 451 and additional set of optical fringes 452 and thereby the location of maximum and minimum Δn may be controlled.

In a preferred embodiment, hologram with controlled side lobes recording system 400 comprising a first reference beam with an angle of 50 degrees and a wavelength of 455.0 nm, a second reference beam with an angle of 50 degrees and a wavelength of 454.3 nm, a master hologram with a playback angle of 0 degrees and a thickness of 20 micrometers, a recording substrate with a thickness of 57 um, and a copy HRM thickness of 8 um will produce a copy HRM with the greatest magnitude of Δn at a depth equidistant from first copy HRM surface 411 and second copy HRM surface 412, the least magnitude of Δn at first copy HRM surface 411 and second copy HRM surface 412, and side lobes with the least magnitude.

In an alternative embodiment, the parameters of the preferred embodiment are used with one modification chosen from a group consisting of: increasing the wavelength of the first reference beam by up to 0.1 nm, decreasing the wavelength of the first reference beam by up to 0.1 nm, increasing the wavelength of the second reference beam by up to 0.1 nm, decreasing the wavelength of the second reference beam by up to 0.1 nm, increasing the angle of the first reference beam and the second reference beam each by up to 8 degrees, decreasing the angle of the first reference beam and the second reference beam each by up to 8 degrees, increasing the master hologram playback angle by up to 8 degrees, decreasing the master hologram playback angle by up to 8 degrees, increasing the master thickness by up to 30 um, decreasing the master thickness by up to 5 um, increasing the recording substrate thickness by up to 9 um, decreasing the recording substrate thickness by up to 9 um, increasing the copy HRM thickness my 1 um, and decreasing the copy HRM thickness by 1 um. The alternative embodiment will produce a copy HRM with a magnitude of Δn at first copy HRM surface 411 and second copy HRM surface 412 less than or equal to 50% of the highest magnitude of Δn within the copy HRM. A person of skill in the art of holography will appreciate that if more than one of the modifications disclosed in the alternative embodiment are applied to the preferred embodiment, and the magnitude of each modification is greater than the magnitude of the modifications disclosed in the alternative embodiment, then a copy HRM with a magnitude of Δn at first copy HRM surface 411 and second copy HRM surface 412 less than or equal to 50% of the highest magnitude of Δn within the copy HRM may be produced; the effect of each modification may at least partially counteract the effect of each other modification.

Substantively similar control of the location of maximum and minimum Δn may be achieved via control of the angles of the first sub-beam of laser light and the second sub-beam of laser light. Substantively similar control of the location of maximum and minimum Δn may be achieved via control of the thickness of master hologram 430. Each fringe in the master hologram diffracts the incoming laser light, at an angle such that the diffracted light interferes at least partially constructively. If the diffracted light is at an angle that results in interference that is not completely constructive, then the interference is also partially destructive. The partially destructive interference decreases the amplitude of the diffracted laser light and simultaneously shifts the phase of the diffracted laser light. The magnitude of the decrease in amplitude and shift in phase is proportional to the number of fringes that contribute to the partially destructive interference, which is in turn dependent on the thickness of the master hologram.

FIG. 4 depicts hologram with controlled side lobes recording system 400 set up to replicate a reflection hologram since laser light source 440 is located on the same side as copy HRM 410. A person of skill in the art will appreciate that hologram with controlled side lobes recording system 400 may also be used to replicate a transmission hologram by moving laser light source 440 to the same side as master hologram 430.

A person of skill in the art of holography will appreciate that while two reference beams are produced by laser light 440 in FIG. 4, laser light source 440 may alternatively produce 3, 4, or more reference beams. Each additional reference beam (in other words, each reference beam beyond the second) will have a wavelength and an angle, will pass through the master hologram, the recording substrate, and the copy HRM, and produce a respective additional diffracted object beam that passes through the recording substrate and the copy HRM. Each additional diffracted object beam will possess a net phase shift and interfere with each respective additional reference beam to produce a respective additional set of optical fringes. Each additional set of optical fringes will possess a respective net phase shift (determined by the wavelength and angle of the respective reference beam, the thickness and playback angle of the master hologram, and the thickness of the recording substrate) and will meta-interfere with each other set of optical fringes to record a hologram with Δn varying as a function of depth. The presence of additional sets of meta-interfering optical fringes allows more complex Δn profiles as a function of depth, allowing greater control of the side lobes of the holograms recorded with hologram with controlled side lobes recording system 400.

Figure 5:
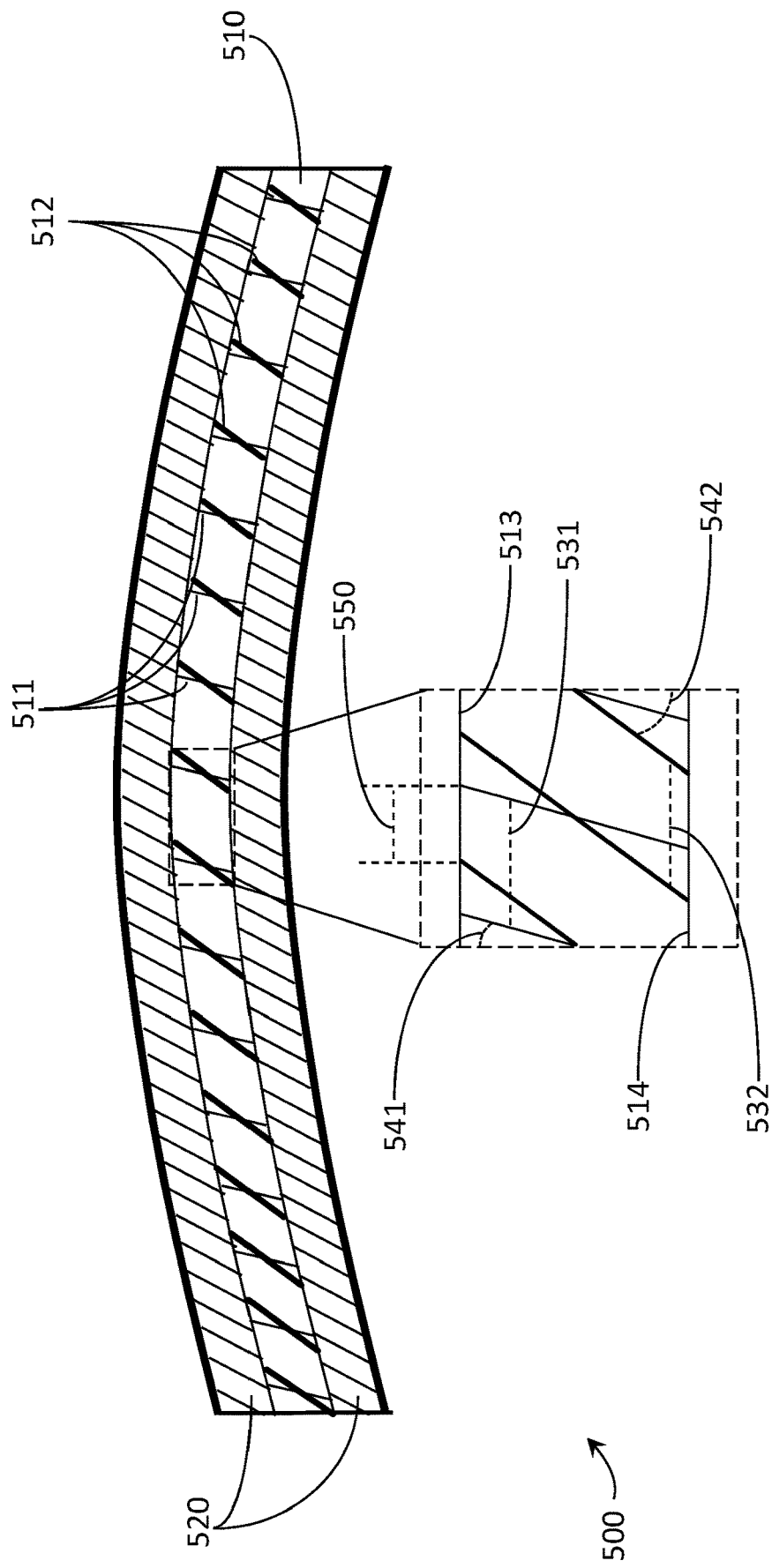
FIG. 5 is a cross-sectional view of an exemplary eyeglass lens with an embedded hologram with controlled side lobes suitable for use as a transparent combiner in a WHUD in accordance with the present systems, devices, and methods.

FIG. 5 is a cross-sectional view of an exemplary eyeglass lens 500 with an embedded hologram with controlled side lobes 510 suitable for use as a transparent combiner in a WHUD in accordance with the present systems, devices, and methods. Eyeglass lens 500 with an embedded HOE 510 comprises hologram with controlled side lobes 510 and lens assembly 520. Hologram with controlled side lobes 510 may be substantively similar to hologram with controlled side lobes 200. Hologram with controlled side lobes 510 is embedded within an internal volume of lens assembly 520. Hologram with controlled side lobes 510 may be physically coupled to lens assembly 520 with a low-temperature optically clear adhesive (LT-OCA).

Hologram with controlled side lobes 510 comprises initial set of fringes 511, additional set of fringes 512, first hologram surface 513, and second hologram surface 514. First hologram surface 513 is opposite second hologram surface 514. First hologram surface 513 and second hologram surface 514 each comprise a two-dimensional surface; first hologram surface 513 and second hologram surface 514 may comprise parallel surfaces. The distance between first hologram surface 513 and second hologram surface 514 is the thickness of hologram with controlled side lobes 510. Hologram with controlled side lobes 510 may be less than ten micrometers thick, less than 100 micrometers thick, or less than one millimeter thick.

Initial set of fringes 511 and additional set of fringes 512 are contained within an internal volume of hologram with controlled side lobes 510. Initial set of fringes 511 possesses initial fringe spacing 531 and initial fringe slant angle 541. Initial fringe spacing 531 comprises the distance between one fringe comprising initial set of fringes 511 and an immediately adjacent fringe comprising initial set of fringes 511. Initial fringe spacing 531 may be measured parallel to first hologram surface 513 and/or second hologram surface 514. Initial fringe slant angle 541 comprises the angle between the fringes comprising initial set of fringes 511 and a line normal to at least one of: first hologram surface 513 and second hologram surface 514.

Additional set of fringes 512 comprises additional fringe spacing 532, additional fringe slant angle 542, and net phase shift 550. Net phase shift 550 comprises the difference in phase between initial set of fringes 511 and additional set of fringes 512 at a depth equidistant between first hologram surface 513 and second hologram surface 514. Additional fringe spacing 532 comprises the distance between one fringe comprising additional set of fringes 512 and an immediately adjacent fringe comprising additional set of fringes 512. Additional fringe spacing 532 may be measured parallel to first surface 513 and/or second surface 514. Additional fringe spacing 532 is equal to initial fringe spacing 531. Additional fringe slant angle 542 comprises the angle between the fringes comprising additional set of fringes 512 and a line normal to at least one of: first hologram surface 513 and second hologram surface 514. Additional fringe slant angle 542 is not equal to initial fringe slant angle 541.

Initial set of fringes 511 and additional set of fringes 512 exhibit meta-interference. Portions of hologram with controlled side lobes 510 that exhibit constructive meta-interference between initial set of fringes 511 and additional set of fringes 512 possess higher Δn. Portions of hologram with controlled side lobes 510 that exhibit destructive meta-interference between initial set of fringes 511 and additional set of fringes 512 possess lower Δn. If Δn is least at depths closest to first surface 513 and/or second surface 514, and if Δn is greatest at a depth equidistant from first hologram surface 513 and second hologram surface 514, then hologram with controlled side lobes 510 will have side lobes with the least possible magnitude. If Δn at depths closest to first hologram surface 513 and/or second hologram surface 514 is less than 50% of Δn at a depth equidistant from first hologram surface 513 and second hologram surface 514 then hologram with controlled side lobes 700 is at least partially apodized and may exhibit side lobes with an intensity less than 25%, less than 10%, or less than one percent of the intensity of the primary peak.

If Δn is greatest at depths closest to first surface 513 and/or second surface 514, and if Δn is least at a depth equidistant from first hologram surface 513 and second hologram surface 514, then hologram with controlled side lobes 510 will have side lobes with the greatest possible magnitude. If Δn at a depth equidistant from first hologram surface 513 and second hologram surface 514 is less than 50% of Δn at depths closest to first hologram surface 513 and/or second hologram surface 514 then hologram with controlled side lobes 510 is at least partially anti-apodized and will exhibit side lobes with an intensity at least 25% of, at least 50% of, or greater than the intensity of the primary peak.

If net phase shift 550 is equal to 0, then hologram with controlled side lobes 510 will be apodized. If net phase shift 550 is equal to $\pi$, then hologram with controlled side lobes 510 will be anti-apodized. A person of skill in the art of holography will appreciate that the position of highest Δn within hologram with controlled side lobes 510 depends on net phase shift 550, and since the magnitude of the side lobes of hologram with controlled side lobes 510 depends on the position of highest Δn, the side lobes of hologram with controlled side lobes 510 may therefore be controlled by controlling net phase shift 550. Control of net phase shift 550 may be achieved by controlling the angle and wavelength of the reference beams used to record initial set of fringes 511 and additional set of fringes 512.

A person of skill in the art of holography will appreciate that hologram with controlled side lobes 510 may comprise more than one additional set of fringes; where each additional set of fringes comprises a respective additional fringe spacing (equal to the initial fringe spacing), additional slant angle, and net phase shift. Each additional set of fringes will also exhibit meta-interference with initial set of fringes 511; hologram with controlled side lobes 510 would thereby possess a more complex distribution of Δn as a function of depth and greater possible control over the relative magnitude of the side lobes of hologram with controlled side lobes 510.

Hologram with controlled side lobes 510 may comprise a wavelength-multiplexed hologram, where initial set of fringes 511 comprises at least two wavelength-specific sub-sets of fringes and additional set of fringes 512 comprises at least two wavelength-specific sub-sets of fringes.

Figure 6:
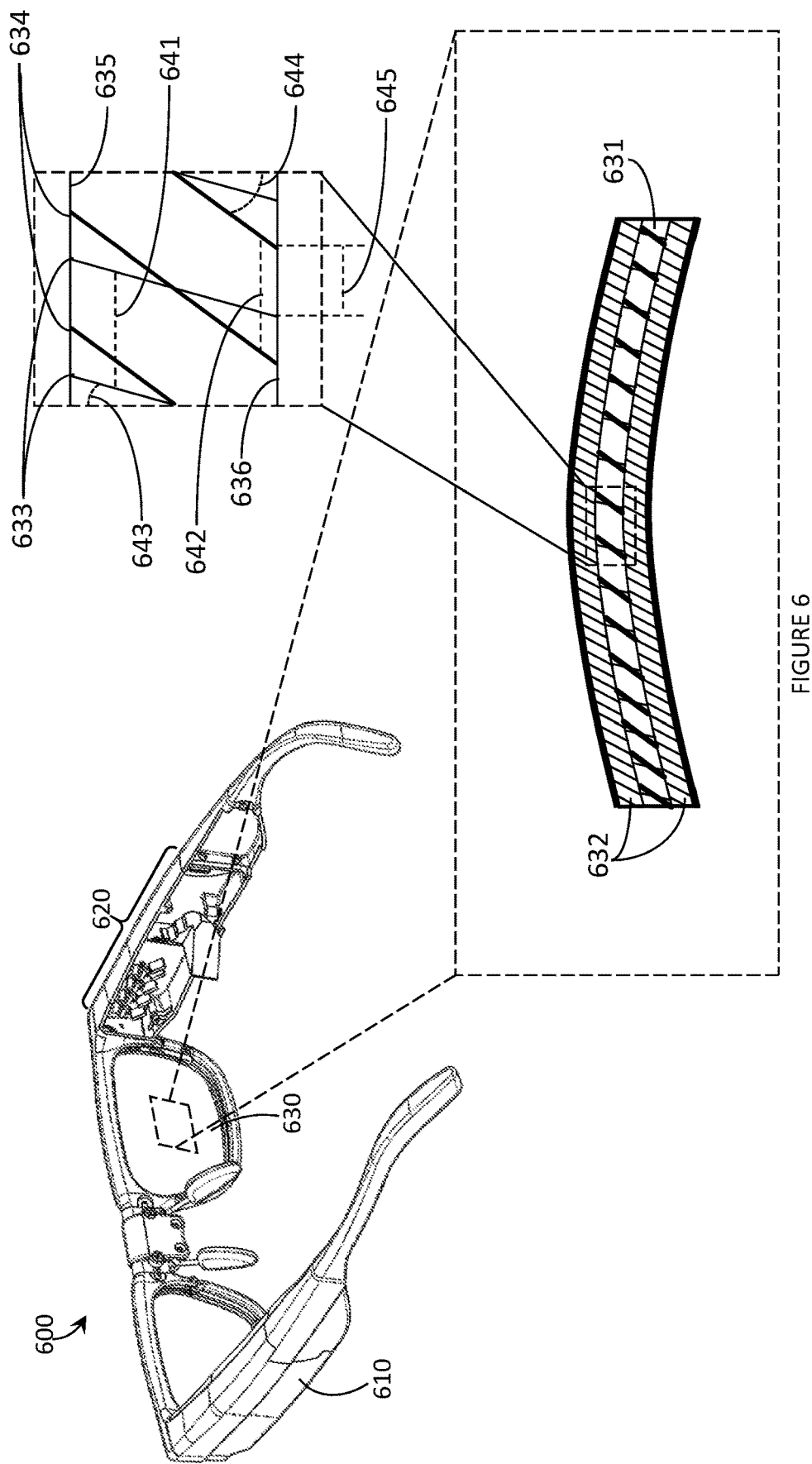
FIG. 6 is a partial-cutaway perspective view of a WHUD that includes an eyeglass lens with an embedded hologram with controlled side lobes in accordance with the present systems, devices, and methods.

FIG. 6 is a partial-cutaway perspective view of a WHUD 600 that includes an eyeglass lens 630 with an embedded hologram with controlled side lobes 631 in accordance with the present systems, devices, and methods. Eyeglass lens 630 may be substantially similar to eyeglass lens 500 from FIG. 5. Embedded hologram with controlled side lobes 631 may be substantively similar to hologram with controlled side lobes 200. WHUD 600 comprises a support structure 610 that is worn on the head of the user and has a general shape and appearance of an eyeglasses (e.g., sunglasses) frame. Support structure 610 carries multiple components, including: an image source 620, and an eyeglass lens 630. Image source 620 is positioned and oriented to direct light towards the eyeglass lens and may include, for example, a micro-display system, a scanning laser projection system, or another system for generating display images. FIG. 6 provides a partial-cutaway view in which regions of support structure 610 have been removed in order to render visible portions of image source 620 and clarify the location of image source 620 within WHUD 600. Eyeglass lens 630 is positioned within a field of view of an eye of the user when the support structure is worn on the head of the user and serves as both a conventional eyeglass lens (i.e., prescription or non-prescription depending on the needs of the user) and a transparent combiner.

Eyeglass lens 630 with an embedded hologram with controlled side lobes 631 comprises hologram with controlled side lobes 631 and lens assembly 632. Hologram with controlled side lobes 631 is embedded within an internal volume of lens assembly 632. Hologram with controlled side lobes 631 may be physically coupled to lens assembly 632 with a low-temperature optically clear adhesive (LT-OCA).

Hologram with controlled side lobes 631 comprises initial set of fringes 633, additional set of fringes 634, first hologram surface 635, and second hologram surface 636. First hologram surface 635 is opposite second hologram surface 636. First hologram surface 635 and second hologram surface 636 each comprise a two-dimensional surface; first hologram surface 635 and second hologram surface 636 may comprise parallel surfaces. The distance between first hologram surface 635 and second hologram surface 636 is the thickness of hologram with controlled side lobes 631. Hologram with controlled side lobes 631 may be less than ten micrometers thick, less than 100 micrometers thick, or less than one millimeter thick.

Initial set of fringes 633 and additional set of fringes 634 are contained within an internal volume of hologram with controlled side lobes 631. Initial set of fringes 633 possesses initial fringe spacing 641 and initial fringe slant angle 643. Initial fringe spacing 641 comprises the distance between one fringe comprising initial set of fringes 633 and an immediately adjacent fringe comprising initial set of fringes 633. Initial fringe spacing 641 may be measured parallel to first hologram surface 635 and/or second hologram surface 636. Initial fringe slant angle 643 comprises the angle between the fringes comprising initial set of fringes 633 and a line normal to at least one of: first hologram surface 635 and second hologram surface 636.

Additional set of fringes 634 comprises additional fringe spacing 642, additional fringe slant angle 644, and net phase shift 645. Net phase shift 645 comprises the difference in phase between initial set of fringes 633 and additional set of fringes 634 at a depth equidistant between first hologram surface 635 and second hologram surface 636. Additional fringe spacing 642 comprises the distance between one fringe comprising additional set of fringes 634 and an immediately adjacent fringe comprising additional set of fringes 634. Additional fringe spacing 642 may be measured parallel to first surface 635 and/or second surface 636. Additional fringe spacing 642 is equal to initial fringe spacing 641. Additional fringe slant angle 644 comprises the angle between the fringes comprising additional set of fringes 634 and a line normal to at least one of: first hologram surface 635 and second hologram surface 636. Additional fringe slant angle 644 is not equal to initial fringe slant angle 643.

Initial set of fringes 633 and additional set of fringes 634 exhibit meta-interference. Portions of hologram with controlled side lobes 631 that exhibit constructive meta-interference between initial set of fringes 633 and additional set of fringes 634 possess higher Δn. Portions of hologram with controlled side lobes 631 that exhibit destructive meta-interference between initial set of fringes 633 and additional set of fringes 634 possess lower Δn. If Δn is least at depths closest to first surface 635 and/or second surface 636, and if Δn is greatest at a depth equidistant from first hologram surface 635 and second hologram surface 636, then hologram with controlled side lobes 631 will have side lobes with the least possible magnitude. If Δn at depths closest to first hologram surface 635 and/or second hologram surface 636 is less than 50% of Δn at a depth equidistant from first hologram surface 635 and second hologram surface 636 then hologram with controlled side lobes 631 is at least partially apodized and may exhibit side lobes with an intensity less than 25%, less than 10%, or less than one percent of the intensity of the primary peak.

If Δn is greatest at depths closest to first surface 635 and/or second surface 636, and if Δn is least at a depth equidistant from first hologram surface 635 and second hologram surface 636, then hologram with controlled side lobes 631 will have side lobes with the greatest possible magnitude. If Δn at a depth equidistant from first hologram surface 635 and second hologram surface 636 is less than 50% of Δn at depths closest to first hologram surface 635 and/or second hologram surface 636 then hologram with controlled side lobes 631 is at least partially anti-apodized and will exhibit side lobes with an intensity at least 25% of, at least 50% of, or greater than the intensity of the primary peak.

If net phase shift 645 is equal to 0, then hologram with controlled side lobes 631 will be apodized. If net phase shift 645 is equal to $\pi$, then hologram with controlled side lobes 631 will be anti-apodized. A person of skill in the art of holography will appreciate that the position of highest Δn within hologram with controlled side lobes 631 depends on net phase shift 645, and since the magnitude of the side lobes of hologram with controlled side lobes 631 depends on the position of highest Δn, the side lobes of hologram with controlled side lobes 631 may therefore be controlled by controlling net phase shift 645. Control of net phase shift 645 may be achieved by controlling the angle and wavelength of the reference beams used to record initial set of fringes 633 and additional set of fringes 634.

A person of skill in the art of holography will appreciate that hologram with controlled side lobes 631 may comprise more than one additional set of fringes; where each additional set of fringes comprises a respective additional fringe spacing (equal to the initial fringe spacing), additional slant angle, and net phase shift. Each additional set of fringes will also exhibit meta-interference with initial set of fringes 633; hologram with controlled side lobes 631 would thereby possess a more complex distribution of Δn as a function of depth and greater possible control over the relative magnitude of the side lobes of hologram with controlled side lobes 631.

Hologram with controlled side lobes 631 may comprise a wavelength-multiplexed hologram, where initial set of fringes 633 comprises at least two wavelength-specific sub-sets of fringes and additional set of fringes 634 comprises at least two wavelength-specific sub-sets of fringes.

Figure 7:
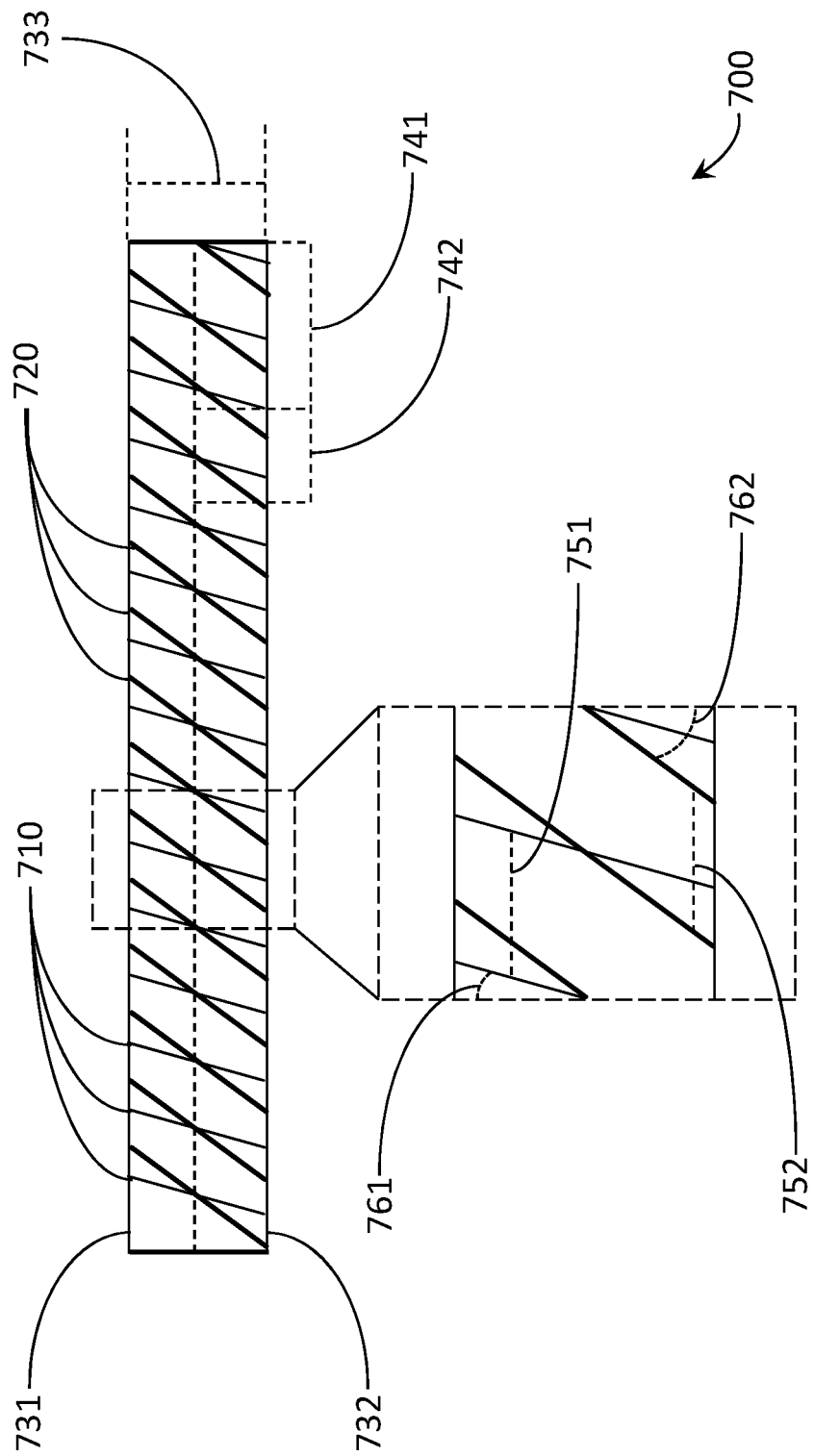
FIG. 7 is a cross-sectional view of hologram with controlled side lobes in accordance with the present systems, devices, and methods.

FIG. 7 is a cross-sectional view of hologram with controlled side lobes 700 in accordance with the present systems, devices, and methods. Hologram with controlled side lobes 700 is substantively similar to hologram with controlled side lobes 200. Hologram with controlled side lobes 700 may be produced by method 100. Hologram with controlled side lobes 700 comprises initial set of fringes 710, additional set of fringes 720, first surface 731, and second surface 732.

First surface 731 is opposite second surface 732. First surface 731 and second surface 732 each comprise a two-dimensional surface. Hologram with controlled side lobes 700 occupies the volume between first surface 731 and second surface 732. First surface 731 and second surface 732 are separated by thickness 733 wherein thickness 733 comprises the shortest distance between first surface 731 and second surface 732 at a given point on or within hologram with controlled side lobes 700. Thickness 733 may be less than ten micrometers, less than one hundred micrometers, or less than one millimeter.

First surface 731 may comprise a curved surface; first surface 731 may be curved spherically or cylindrically around a focal point or focal line, respectively. Second surface 732 may comprise a curved surface; second surface 732 may be curved spherically or cylindrically around a focal point or focal line, respectively. First surface 731 and second surface 732 may comprise parallel surfaces.

Initial set of fringes 710 is located within an internal volume of hologram with controlled side lobes 700. For the sake of clarity, initial set of fringes 710 has been depicted as a series of lines, where the lines denote the spacing between fringes. A person of skill in the art of holography will appreciate that fringes may comprise local maxima (or minima) of either absorbance or refractive index, and these maxima (or minima) may not show sharp boundaries between regions of high (or low) absorbance or refractive index; however, the maxima (or minima) of either absorbance or refractive index demonstrate directionality and periodicity and may be reasonably depicted and interpreted as a repeating pattern of discrete lines.

Initial set of fringes 710 comprises initial fringe phase 741, initial fringe spacing 751, and initial fringe slant angle 761. Initial fringe phase 741 is depicted as being measured from the lateral edge of hologram with controlled side lobes 700 to a particular fringe of initial set of fringes 710 at a depth equidistant between first surface 731 and second surface 732, however a person of skill in the art of holography will appreciate that, due to the periodic nature of the fringes comprising initial set of fringes 710, initial fringe phase 741 could be measured from any fixed point in or on hologram with controlled side lobes 700 to any fringe of initial set of fringes 710.

Initial fringe spacing 751 comprises the distance between one fringe comprising initial set of fringes 710 and an immediately adjacent fringe comprising initial set of fringes 710. Initial fringe spacing 751 may be measured parallel to first surface 731 and/or second surface 732. Initial fringe spacing 751 at least partially determines the wavelength or range of wavelengths of incident light that may be diffracted by initial set of fringes 710; in other words, initial fringe spacing 751 at least partially determines the wavelength(s) of light that may be used as an object beam to play back the hologram which initial set of fringes 710 comprises.

Initial fringe slant angle 761 comprises the angle between the fringes comprising initial set of fringes 710 and a line normal to at least one of: first surface 731 and second surface 732. In other words, if the fringes comprising initial set of fringes 710 are parallel to first surface 731 then the fringes comprising initial set of fringes 710 would have a slant angle of 90 degrees. If the laser light used to record initial set of fringes 710 consists of plane waves then initial fringe slant angle 761 will be constant throughout hologram with controlled side lobes 700. If the laser light used to record initial set of fringes 710 comprises spherical waves then initial fringe slant angle 761 will vary throughout hologram with controlled side lobes 700; however, the variation in slant angle caused by spherical waves is negligible with regard to controlling the distribution of Δn, and thereby controlling the sidelobes of hologram with controlled sidelobes 700, so long as the focal point of each spherical wave is located at a distance equal to at least 50%, at least 100%, or at least 200% of the largest lateral dimension of hologram with controlled side lobes 700.

Additional set of fringes 720 is located within an internal volume of hologram with controlled side lobes 700. For the sake of clarity, additional set of fringes 720 has been depicted as a series of lines, where the lines denote the angle, phase, and the spacing between fringes. Additional set of fringes 720 comprises net phase shift 742, additional fringe spacing 752, and additional fringe slant angle 762. Net phase shift 742 comprises the difference in phase between initial set of fringes 710 and additional set of fringes 720 at a depth equidistant between first surface 731 and second surface 732. Net phase shift 742 is depicted as being measured between a particular fringe of additional set of fringes 720 and a particular fringe of initial set of fringes 710, however a person of skill in the art of holography will appreciate that, due to the periodic nature of the fringes comprising additional set of fringes 720, net phase shift 742 could be measured from any fringe of initial set of fringes 710 to any fringe of additional set of fringes 720. Additional fringe spacing 752 comprises the distance between one fringe comprising additional set of fringes 720 and an immediately adjacent fringe comprising additional set of fringes 720.

Additional fringe spacing 752 may be measured parallel to first surface 731 and/or second surface 732. Additional fringe spacing 752 at least partially determines the wavelength or range of wavelengths of incident light that may be diffracted by additional set of fringes 720; in other words, additional fringe spacing 752 at least partially determines the wavelength(s) of light that may be used as an object beam to play back the hologram which additional set of fringes 720 comprises. Additional fringe spacing 752 is equal to initial fringe spacing 751.

Additional fringe slant angle 762 comprises the angle between the fringes comprising additional set of fringes 720 and a line normal to at least one of: first surface 731 and second surface 732. If the laser light used to record additional set of fringes 720 consists of plane waves then additional fringe slant angle 762 will be constant throughout hologram with controlled side lobes 700. If the laser light used to record additional set of fringes 720 comprises spherical waves then additional fringe slant angle 762 will vary throughout hologram with controlled side lobes 700; however, the variation in slant angle caused by spherical waves is negligible with regard to controlling the distribution of Δn, and thereby controlling the sidelobes of hologram with controlled sidelobes 700, so long as the focal point of each spherical wave is located at a distance equal to at least 50%, at least 100%, or at least 200% of the largest lateral dimension of hologram with controlled side lobes 700. Additional fringe slant angle 762 is not equal to initial fringe slant angle 761.

Initial set of fringes 710 and additional set of fringes 720 exhibit meta-interference. Portions of hologram with controlled side lobes 700 that exhibit constructive meta-interference between initial set of fringes 710 and additional set of fringes 720 possess higher Δn. Portions of hologram with controlled side lobes 700 that exhibit destructive meta-interference between initial set of fringes 710 and additional set of fringes 720 possess lower Δn. If Δn is least at depths closest to first surface 731 and/or second surface 732, and if Δn is greatest at a depth equidistant from first surface 731 and second surface 732, then hologram with controlled side lobes 700 will have side lobes with the least possible magnitude; in other words hologram with controlled side lobes 700 is apodized. If Δn at depths closest to first surface 731 and/or second surface 732 is less than 50% of Δn at a depth equidistant from first surface 731 and second surface 732 then hologram with controlled side lobes 700 is at least partially apodized and may exhibit side lobes with an intensity less than 25%, less than 10%, or less than one percent of the intensity of the primary peak.

If Δn is greatest at depths closest to first surface 731 and/or second surface 732, and if Δn is least at a depth equidistant from first surface 731 and second surface 732, then hologram with controlled side lobes 700 will have side lobes with the greatest possible magnitude; in other words, hologram with controlled side lobes 700 is anti-apodized. Higher Δn at first surface 731 and second surface 732 increases the magnitude of the side lobes, while higher Δn at a point equidistant between first surface 731 and second surface 732 increases the magnitude of the primary peak. If Δn at a depth equidistant from first surface 731 and second surface 732 is less than 50% of Δn at depths closest to first surface 731 and/or second surface 732 then hologram with controlled side lobes 700 is at least partially anti-apodized and will exhibit side lobes with an intensity at least 25% of, at least 50% of, or greater than the intensity of the primary peak.

Net phase shift 742 may be expressed in units of radians, where a phase shift of $2\pi$ is equal to a phase shift of 0. If net phase shift 742 is equal to 0, then hologram with controlled side lobes 700 will be apodized. If net phase shift 742 is equal to $\pi$, then hologram with controlled side lobes 700 will be anti-apodized. A person of skill in the art of holography will appreciate that the position of highest Δn within hologram with controlled side lobes 700 depends on net phase shift 742, and since the magnitude of the side lobes of hologram with controlled side lobes 700 depends on the position of highest Δn, the side lobes of hologram with controlled side lobes 700 may therefore be controlled by controlling net phase shift 742. Control of net phase shift 742 may be achieved by controlling the angle and wavelength of the reference beams used to record initial set of fringes 710 and additional set of fringes 720.

Any increase in Δn as a function of depth within hologram with controlled side lobes 700 will be a continuous increase if only two sets of fringes are present in hologram with controlled side lobes 700. Any decrease in Δn as a function of depth within hologram with controlled side lobes 700 will be a continuous decrease if only two sets of fringes are present in hologram with controlled side lobes 700. More complex variation in Δn as a function of depth within hologram with controlled side lobes 700 requires more than two sets of fringes within hologram with controlled side lobes 700.

A person of skill in the art of holography will appreciate that hologram with controlled side lobes 700 may comprise more than one additional set of fringes; where each additional set of fringes comprises a respective additional fringe spacing (equal to the initial fringe spacing), additional slant angle, and net phase shift. Each additional set of fringes will also exhibit meta-interference with initial set of fringes 710; hologram with controlled side lobes 700 would thereby possess a more complex distribution of Δn as a function of depth and greater possible control over the relative magnitude of the side lobes of hologram with controlled side lobes 700.

Hologram with controlled side lobes 700 may comprise a wavelength-multiplexed hologram, where initial set of fringes 710 comprises at least two wavelength-specific sub-sets of fringes and additional set of fringes 720 comprises at least two wavelength-specific sub-sets of fringes. A wavelength-specific sub-set of fringes diffracts laser light with a range of wavelengths that is at least partially different from the range of wavelengths diffracted by each other wavelength-specific sub-set of fringes. Hologram with controlled side lobes 700 may comprise a red hologram, a green hologram, a blue hologram, and an infrared hologram, where each color of hologram corresponds to a respective initial wavelength-specific sub-set of initial and additional fringes.

The intensity of the side lobes of a hologram may be measured relative to the intensity of the primary peak of the hologram. Relative to the primary peak of the hologram, the intensity of the side lobes of the blue hologram, the green hologram, the red hologram, and the infrared hologram may be equal. Due to the large difference in wavelength between each color hologram, careful selection of wavelength and angle is required for each reference beam employed in the production of hologram with controlled side lobes 700 to ensure that each color hologram has the same net phase shift when recorded on a recording substrate with a constant thickness.

Figure 8:
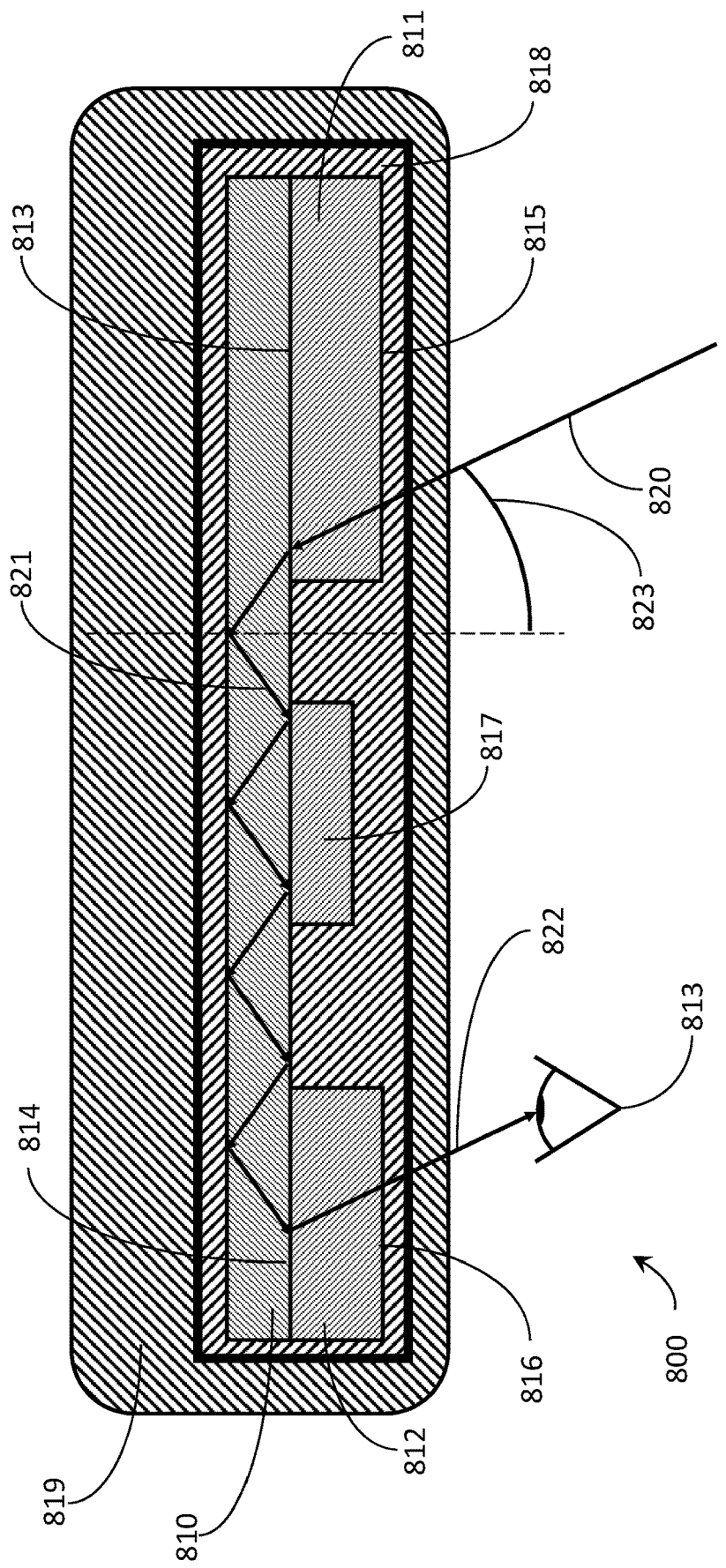
FIG. 8 is a cross-sectional view of an exemplary eyeglass lens with comprising a light guide and a hologram with controlled side lobes in accordance with the present systems, devices, and methods.

FIG. 8 is a cross-sectional view of an exemplary eyeglass lens 800 with comprising a light guide and a hologram with controlled side lobes in accordance with the present systems, devices, and methods. Eyeglass lens 800 comprises light guide 810, in-coupler 811, out-coupler 812, cladding layer 818 and lens layer 819.

Cladding layer 818 surrounds light guide 810, in-coupler 811, and GRIN-outcoupler 812. Cladding layer 818 comprises a low index material, where cladding layer may comprise a material with a refractive index of 1.5, 1.2, or 1.0. A lower refractive index is more advantageous as this increases the field of view of the light guide when the light guide is used as a display. A non-exclusive example of a cladding material with a refractive index of 1.5 is a plastic material (PET, acrylic, Nylon, etc.). A non-exclusive example of a cladding material with a refractive index of 1.2 is a layer of silica sol-gel. A non-exclusive example of a cladding material with a refractive index of 1.0 is air, where a cladding layer comprising air typically includes additional material to provide structural support to the light guide.

In-coupler 811 comprises first surface 813 and third surface 815. In-coupler 811 is physically coupled to light guide 810 at first surface 813; in-coupler 811 is positioned and oriented to redirect light into light guide 810. Out-coupler 812 comprises second surface 814 and fourth surface 816. Out-coupler 812 is physically coupled to light guide 810 at second surface 814; out-coupler 812 is positioned and oriented to redirect light out of light guide 810.

Beam of light 820 impinges on in-coupler 811 with incident angle 823 and is redirected into light guide 810 at an angle greater than the critical angle for light guide 810. Beam of light 820 is diffracted by incoupler 811 and is converted to guided light 821. Guided light 821 propagates through light guide 810 at an angle greater than the critical angle, bouncing off of the opposed surfaces of light guide 810 due to total internal reflection (TIR). Upon reaching out-coupler 812, guided light 821 is redirected out of light guide 810 to form redirected light 822; redirected light 822 is directed towards an eye of a user 813.

Eyeglass lens 800 may further comprise exit pupil expander 817; exit pupil expander 817 may be physically coupled to light guide 810. Exit pupil expander 817 may replicate guided light 821 to form additional beams of light, where the additional beams of light propagate to the out-coupler and may be redirected out of light guide 810 towards an eye of a user 813, expanding the eyebox of eyeglass lens 800 when eyeglass lens 800 is utilized in a wearable heads-up display. Light guide 810 may advantageously comprise a high index material.

Each of: in-coupler 811, out-coupler 812, and/or exit pupil expander 817, may comprise a hologram with controlled side lobes substantively similar to hologram with controlled side lobes 200. Eyeglass lens 800 may be similar in some ways to eyeglass lens 500. Eyeglass lens 800 may similar in some ways to eyeglass lens 630.

A person of skill in the art will appreciate that the various embodiments for side lobe control in holograms described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Publication No. US 2015-0378161 A1, U.S. Non-Provisional patent application Ser. No. 15/046,234, U.S. Non-Provisional patent application Ser. No. 15/046,254, U.S. Non-Provisional patent application Ser. No. 15/046,269, U.S. Provisional Patent Application Ser. No. 62/156,736, U.S. Provisional Patent Application Ser. No. 62/214,600, U.S. Provisional Patent Application Ser. No. 62/167,767, U.S. Provisional Patent Application Ser. No. 62/271,135, U.S. Provisional Patent Application Ser. No. 62/245,792, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, US Patent Application Publication No. US 2017-0068095 A1; US Patent Application Publication No. US 2017-0212290 A1; U.S. Provisional Patent Application Ser. No. 62/482,062; U.S. Provisional Patent Application Ser. No. 62/534,099, U.S. Provisional Patent Application Ser. No. 62/557,551, U.S. Provisional Patent Application Ser. No. 62/557,554, U.S. Provisional Patent Application Ser. No. 62/565,677, U.S. Provisional Patent Application Ser. No. 62/631,278, and U.S. Provisional Patent Application Ser. No. 62/664,758 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hologram with controlled side lobes recording system comprising:
  a recording substrate comprising a master-side surface and copy-side surface;
  a copy holographic recording medium (HRM) comprising a first copy HRM surface and a second copy HRM surface, wherein the first copy surface is physically coupled to the copy HRM-side surface of the recording substrate;
  a master hologram comprising master hologram fringes wherein the master hologram is physically coupled to the master-side surface;
  a laser light source;
  a first reference beam produced by the laser light source, wherein the first reference beam passes through the copy HRM, passes through the recording substrate, and impinges on the master hologram;
  a second reference beam produced by the laser light source, the second reference beam having a same color as the first reference beam, wherein the second reference beam passes through the copy HRM, passes through the recording substrate, and impinges on the master hologram;

a first diffracted object beam, wherein the first diffracted object beam passes through the recording substrate and passes through the copy HRM; and a second diffracted object beam, wherein the second diffracted object beam passes through the recording substrate and passes through the copy HRM.

2. The system of claim 1, wherein the second reference beam is of a different wavelength than the first reference beam.

3. The system of claim 1, wherein the second reference beam is of a different angle than the first reference beam.

4. The system of claim 1, wherein the first reference beam and the first diffracted object beam interfere to produce an initial set of fringes, the second reference beam and the second diffracted object beam interfere to form an additional set of fringes, and the initial set of fringes and the additional set of fringes meta-interfere.

5. The system of claim 4, wherein the initial set of fringes and each additional set of fringes meta-interfere most destructively at a depth within the hologram corresponding to at least one of: the first copy HRM surface and the second copy HRM surface and the initial set of fringes and each additional set of fringes meta-interfere most constructively at a depth equidistant between the first copy HRM surface and the second copy HRM surface.

6. The system of claim 4, wherein the initial set of fringes and each additional set of fringes meta-interfere most constructively at a depth within the hologram corresponding to at least one of: the first copy HRM surface and the second copy HRM surface and the initial set of fringes and each additional set of fringes meta-interfere most destructively at a depth equidistant between the first copy HRM surface and the second copy HRM surface.

7. The system of claim 1, wherein the master hologram comprises a wavelength-multiplexed master hologram, the wavelength-multiplexed master hologram comprising:

a red hologram;
a green hologram; and
a blue hologram;
and wherein the system further comprises:
at least two blue reference beams;
at least two green reference beams; and
at least two red reference beams.

\* \* \* \* \*